(12) United States Patent  
Sily

(10) Patent No.: US 12,359,712 B1
(45) Date of Patent: Jul. 15, 2025

(54) COMBINED MATERIAL GEAR

(71) Applicant: PRINCE MOHAMMAD BIN FAHD UNIVERSITY, Dhahran (SA)

(72) Inventor: Omar Dawood Mohammed Sily, Dhahran (SA)

(73) Assignee: PRINCE MOHAMMAD BIN FAHD UNIVERSITY, Dhahran (SA)

( * ) Notice: Subject to any disclaimer, the term of this patent is extended or adjusted under 35 U.S.C. 154(b) by 0 days.

(21) Appl. No.: 19/096,280

(22) Filed: Mar. 31, 2025

(51) Int. Cl.
*F16H 55/06* (2006.01)
*F16H 1/10* (2006.01)
*F16H 55/17* (2006.01)

(52) U.S. Cl.
CPC .............. *F16H 55/06* (2013.01); *F16H 1/10* (2013.01); *F16H 55/17* (2013.01); *F16H 2055/065* (2013.01); *F16H 2055/176* (2013.01)

(58) Field of Classification Search
CPC . F16H 55/06; F16H 1/10; F16H 55/17; F16H 2055/065; F16H 2055/176
See application file for complete search history.

(56) References Cited

U.S. PATENT DOCUMENTS

| 11,448,303 | B2 * | 9/2022 | Kobayashi | .............. F16H 55/17 |
| 2002/0043124 | A1 | 4/2002 | Shiga et al. | |
| 2008/0146402 | A1 | 6/2008 | Shinohara | |
| 2018/0320772 | A1 | 11/2018 | Anand et al. | |
| 2021/0180676 | A1 | 6/2021 | Kiyota et al. | |

FOREIGN PATENT DOCUMENTS

JP  6911690 B2  7/2021

\* cited by examiner

*Primary Examiner* — Terence Boes
(74) *Attorney, Agent, or Firm* — Oblon, McClelland, Maier & Neustadt, L.L.P.

(57) ABSTRACT

A combined material gear and a method of assembling therefor includes a toothed ring gear having evenly spaced outer gear teeth on an outer circumference and made of a metallic material. An inner ring of the toothed ring gear is configured with evenly spaced inner gear teeth alternating with inner gear grooves. A radially extending rib is centrally located within the inner ring between each inner gear tooth. First and second spline gears, made of one of a thermoplastic material and a powder metal material, have an outer circumference with evenly spaced outer spline teeth alternating with outer spline grooves. The outer spline teeth fit in the inner gear grooves of the toothed ring gear and abut the radially extending rib, with each spline gear being on opposite side. This configuration provides improved damping, self-alignment, and a balance of strength and weight.

20 Claims, 11 Drawing Sheets

COMBINED MATERIAL GEAR

BACKGROUND

Technical Field

The present disclosure is directed to gear systems used for power transmission. More specifically, the present disclosure relates to a combined material gear that utilizes different materials to achieve an improved balance of strength, durability, damping, self-alignment, weight, and cost compared to conventional single-material gear systems.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Gear systems are fundamental components in a wide variety of mechanical devices and machines, serving the crucial role of transmitting rotational motion and power between shafts. These systems typically employ a series of intermeshing gears with precisely engineered tooth profiles to achieve desired speed and torque ratios. The performance and reliability of gear systems are highly dependent on factors such as material properties, manufacturing precision, and the alignment of the interacting gears. The gears are arranged in specific configurations to achieve desired speed, torque, and directional modifications. Gear transmissions operate optimally when all components are perfectly aligned, maintaining precise contact patterns between meshing gear teeth.

In practical applications, however, achieving and maintaining perfect alignment in gear systems is a significant challenge. Various factors contribute to misalignment, including, but not limited to, deflections of transmission components under load, manufacturing tolerances that accumulate during the production process, errors introduced during assembly, thermal expansion of materials due to temperature variations, wear and tear of bearings over time, and shaft deflection that occurs when loads are applied. Misalignment, even at seemingly small levels, can have detrimental effects on gear system performance. It leads to uneven load distribution across the gear tooth flanks, altering the intended contact pattern. This non-uniform contact results in stress concentrations in localized areas of the gear teeth, significantly increasing both contact and bending stresses, especially under high-load conditions. These elevated stress levels can initiate premature tooth fatigue, accelerate wear, and lead to surface defects like pitting and spalling, ultimately leading to catastrophic failure of the gear components. In a gear design, misalignment imposes considerable constraints on defining gear macro/micro-geometry and maximum acceptable load capacity, often necessitating designers to implement substantial safety factors that reduce system efficiency or increase size and weight.

Conventional approaches to address the challenges of gear misalignment have explored several strategies. One approach is to manufacture gears with modified tooth profiles, such as crowned or relieved teeth, which are designed to maintain contact even under slight misalignment conditions. Another common solution is the implementation of flexible couplings between shafts, which allow for a degree of angular or parallel offset while still transmitting torque. Self-aligning bearings, which can accommodate some shaft misalignment, are also frequently employed. Other approaches involve incorporating crowned gear teeth, which have a slightly convex profile to maintain contact even with angular misalignment, or using elastomeric materials at interface points within the gear system to provide damping and absorb some misalignment. Some solutions include cushioning materials on gear teeth and elastomeric extensions on gear tooth sides.

However, these existing approaches often suffer from significant limitations. Many conventional solutions offer only limited misalignment compensation capacity, i.e., they can only tolerate small deviations from perfect alignment. They may also exhibit inadequate load-bearing capability when misalignment is present, leading to reduced performance or premature failure under high loads. Some solutions are inherently complex, leading to manufacturing challenges and increased costs. Furthermore, many existing solutions struggle to handle both radial and axial forces simultaneously, which are often present in real-world gear systems. Existing approaches compromise between misalignment accommodation and torque transfer capacity, leading to suboptimal performance in high-demand applications. In addition, existing solutions may increase backlash (undesirable free play in the gear system), generate additional noise during operation, require frequent maintenance, or deteriorate rapidly under high temperature or high load conditions, making them unsuitable for many industrial applications.

US20180320772A1 describes a gear having a steel toothed annular flange with gear teeth defined on a periphery of the flange. The gear includes a steel hub coaxially aligned with the steel toothed annular flange, and a web formed from a material such as aluminum, an aluminum alloy, or a fiber-reinforced polymer composite. While this reference describes a gear with different materials for certain components, it does not describe a multi-component configuration with a metallic toothed ring gear and separate, non-metallic spline gears arranged for improved damping and alignment.

US20020043124A1 describes a plastic gear having a steel hub, a center ring made of synthetic resin reinforced with metal fibers, and gear teeth made of synthetic resin without the metal fibers. This reference focuses on a gear with predominantly plastic components. However, this references does not describe a multi-component configuration with a metallic toothed ring gear and separate, non-metallic spline gears arranged for improved damping and alignment.

JP6911690B2 describes a gear having a steel hub and an outer ring of fiber-reinforced plastic or resin, with gear teeth formed on the outer ring. This reference focuses on a gear combining a metal hub with a non-metallic outer ring. However, this reference does not describe a multi-component configuration with a metallic toothed ring gear and separate, non-metallic spline gears arranged for improved damping and alignment.

US20210180676A1 describes a worm gear having an inner wheel made of metal and an outer wheel having gear teeth made of resin. This reference focuses on a worm gear configuration with differing materials for the inner and outer wheels. However, this reference does not describe a multi-component configuration with a metallic toothed ring gear and separate, non-metallic spline gears arranged for improved damping and alignment.

US20080146402A1 describes a plastic spur gear having a metal insert and plastic gear teeth. This reference focuses on a gear with a metal insert for reinforcement within a predominantly plastic structure. However, this reference does not describe a multi-component configuration with a metallic toothed ring gear and separate, non-metallic spline gears arranged for improved damping and alignment.

Each of the aforementioned references suffers from one or more drawbacks hindering their adoption, such as limited misalignment compensation capacity, inadequate load-bearing capability under misaligned conditions, excessive complexity leading to manufacturing difficulties, lack of inherent self-alignment functionality, and/or an inability to handle both radial and axial forces effectively. Existing solutions often represent a compromise between misalignment accommodation and torque transfer capacity, leading to suboptimal performance in demanding applications. Furthermore, these conventional approaches may increase backlash, generate additional noise, require frequent maintenance, or exhibit reduced durability under high temperatures or loads.

Accordingly, it is one object of the present disclosure to provide a gear system that overcomes these limitations by strategically combining the beneficial properties of different materials to achieve a balance between strength, durability, damping, self-alignment, weight, and cost, while maintaining performance under various operating conditions.

SUMMARY

In an exemplary embodiment, a combined material gear is described, comprising; a toothed ring gear having a plurality of evenly spaced outer gear teeth located on an outer circumference, wherein the tooth ring gear is made of metallic material; an inner ring of the toothed ring gear configured with a plurality of evenly spaced inner gear teeth alternating with a plurality of inner gear grooves; a radially extending rib centrally located within the inner ring of the toothed ring gear between each inner gear tooth; a first spline gear configured with an outer circumference comprising a plurality of evenly spaced outer spline teeth alternating with a plurality of outer spline grooves, wherein the outer spline teeth are configured to fit in the inner gear grooves of the toothed ring gear and abut the radially extending rib when the first spline gear is assembled to a first side of the toothed ring gear, wherein the first spline gear is further configured with an inner ring comprising a plurality of evenly spaced inner spline teeth alternating with a plurality of inner spline grooves; and a second spline gear identical in configuration to the first spline gear, wherein the outer spline teeth of the second spline gear are configured to fit in the inner gear grooves of the toothed ring gear and abut the radially extending rib when the second spline gear is assembled to a second side of the toothed ring gear, wherein the first spline gear and the second spline gear are made of one of a thermoplastic material and a powder metal material.

In another exemplary embodiment, a method of assembling a self-aligning combined material gear is described, comprising: receiving a toothed ring gear having a plurality of evenly spaced outer gear teeth located on an outer circumference, wherein the tooth ring gear is made of metallic material, wherein an inner ring of the toothed ring gear is configured with a plurality of evenly spaced inner gear teeth alternating with a plurality of inner gear grooves, wherein each of the inner gear grooves includes a radially extending rib centrally located between each inner gear tooth; coating each of the inner gear teeth and the inner gear grooves with a first glue layer; inserting, from a first side of the toothed ring gear, a first spline gear made of one of a thermoplastic material and a powder metal material, the first spline gear having an outer circumference comprising a plurality of evenly spaced outer spline teeth and an inner ring comprising a plurality of evenly spaced inner spline teeth alternating with a plurality of inner spline grooves, between the inner gear grooves of the toothed ring gear until each outer spline tooth abuts the radially extending rib; and inserting, from a second side of the toothed ring gear, a second spline gear identical in configuration to the first spline gear and made of one of a thermoplastic material and a powder metal material, between the inner gear grooves of the toothed ring gear until each outer spline tooth abuts the radially extending rib.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
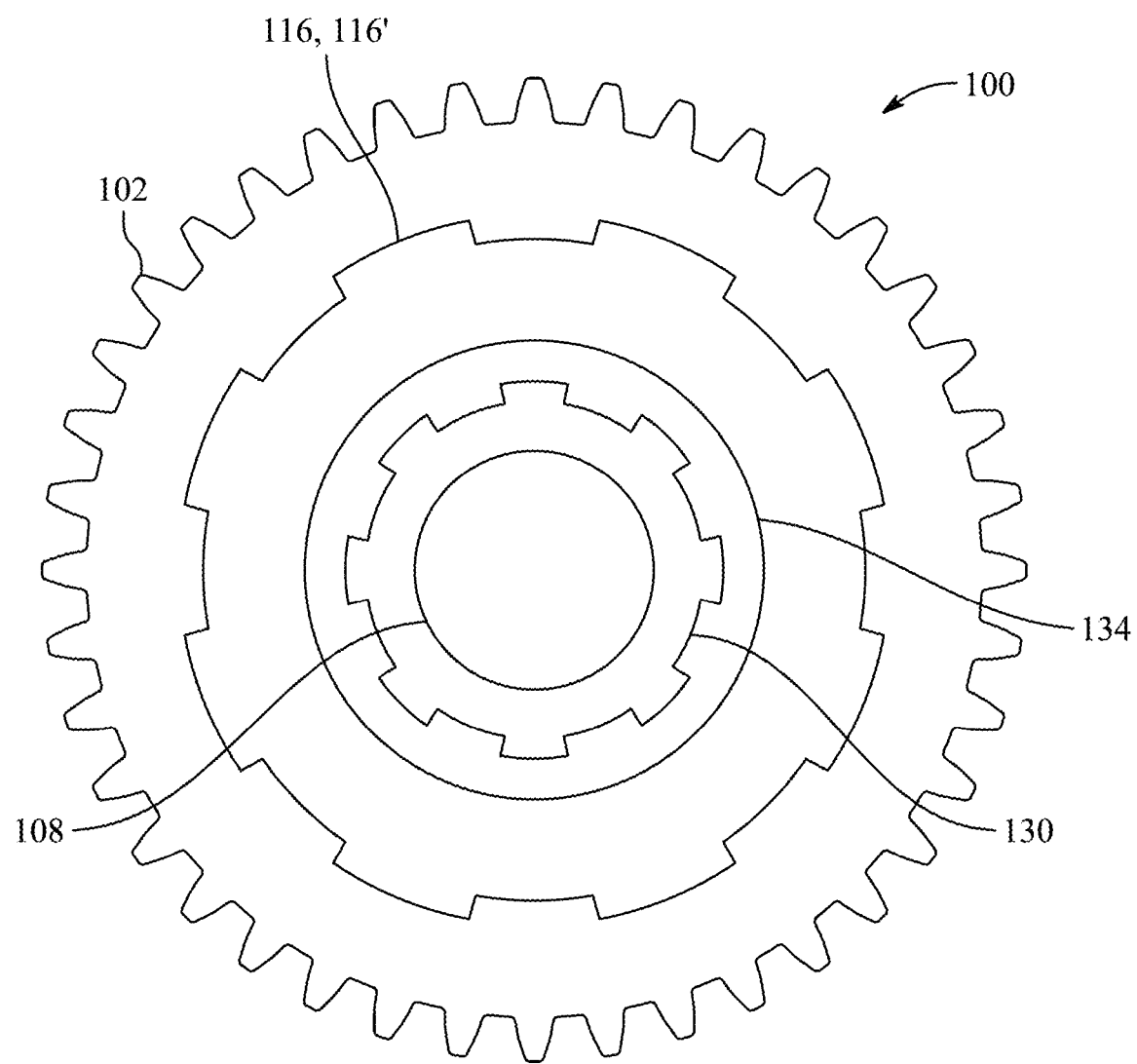
FIG. 1 is an exemplary diagram showing a front view of a combined material gear, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Certain figures may include dimensions, such as lengths, diameters, or thicknesses. These dimensions are provided for illustrative purposes only, representing exemplary embodiments, and should not be construed as limiting the scope of the present disclosure in any manner. Variations in dimensions are contemplated and fall within the scope of the present disclosure.

Aspects of this disclosure are directed to a combined material gear and method of assembly therefor, which address the challenges of misalignment, noise, vibration, weight, and cost in power transmission applications. The combined material gear utilizes a multi-material construction, integrating components made of different materials, each selected for its specific properties and contribution to the overall performance. This approach allows for the optimization of characteristics of the gear system, achieving a balance between strength and flexibility, durability and damping, precision and self-alignment. The design incorporates features that facilitate assembly, ensure secure connections between components, and provide resistance to both radial and axial forces. The combined material is adaptable to various gear configurations and operating conditions, offering a versatile solution for a wide range of applications.

Referring to FIG. 1, illustrated is an exemplary diagram of a combined material gear (as represented by reference numeral 100, and hereinafter sometimes generally referred to as "gear system" without any limitations). The combined material gear 100 is designed to address the limitations of traditional, single-material gear systems by strategically combining different materials to achieve an optimal balance of strength, durability, damping characteristics, self-alignment capabilities, weight, and overall cost. The combined material gear 100 achieves this by utilizing a metallic material for components experiencing high stresses, such as the toothed ring gear and the locking assembly, and a different material, such as a thermoplastic or a powder metal, for components where lower stresses are expected, such as the spline gears. This strategic combination allows the gear system to leverage the advantages of each material type, resulting in improved performance and efficiency.

As illustrated in FIG. 1, the combined material gear 100 comprises multiple components, including a toothed ring gear 102, a first spline gear 116, a second spline gear 116', a flanged hub 130, and a threaded disc 134. It may be noted that while the first spline gear 116 is explicitly visible in FIG. 1, the second spline gear 116', being identical in configuration, is located directly behind the toothed ring gear 102 in this view, and thus is not directly visible. These components, i.e., the toothed ring gear 102, the first spline gear 116, the second spline gear 116', the flanged hub 130, and the threaded disc 134, are arranged coaxially, sharing a common central axis. This axis also corresponds to the axis of rotation of the combined material gear 100. Furthermore, these components are configured to receive a shaft 108. The shaft 108 is represented schematically in FIG. 1 by a circle and is intended to be inserted through central openings in each of the aforementioned components. The shaft 108 represents the input or output shaft to which the combined material gear 100 is connected for the purpose of transmitting rotational motion and power.

Figure 2A:
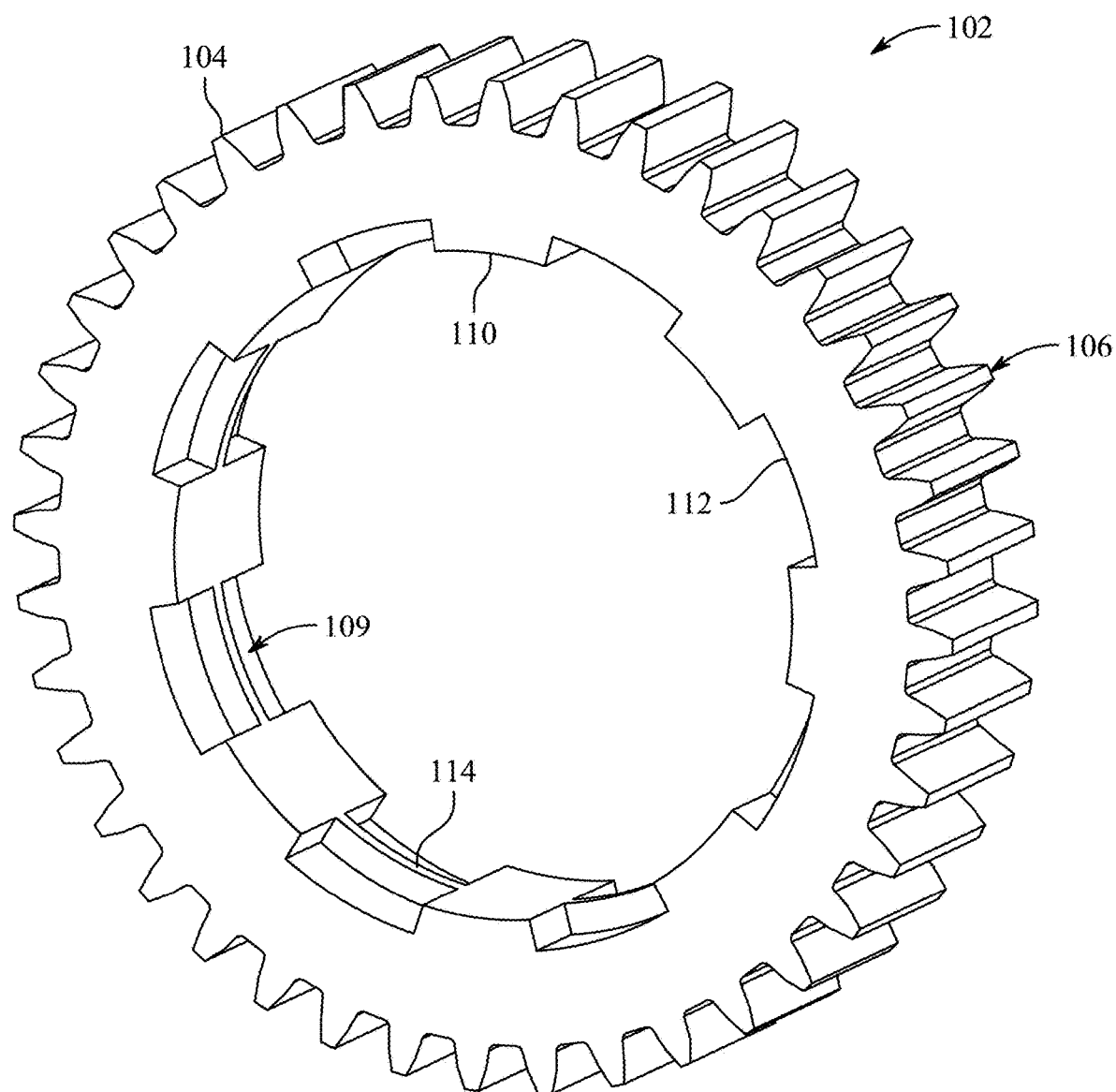
FIG. 2A is an exemplary diagram showing a perspective view of a toothed ring gear of the combined material gear, according to certain embodiments.
Figure 2B:
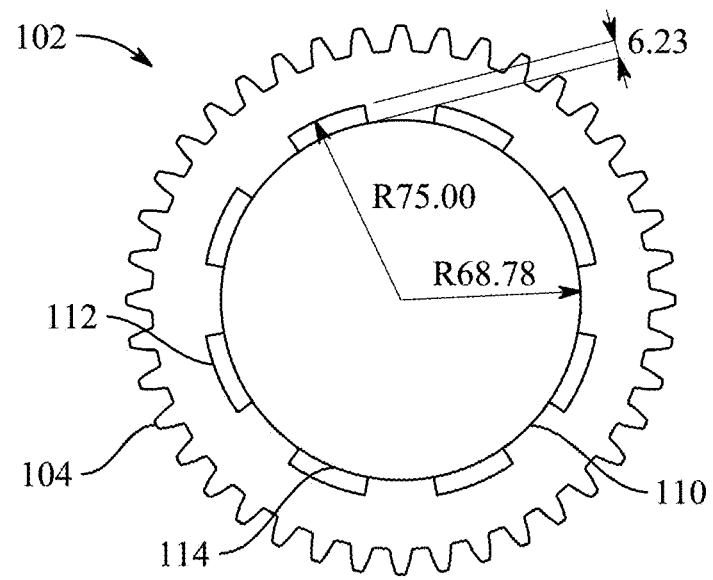
FIG. 2B is an exemplary diagram showing a top plan view of the toothed ring gear, according to certain embodiments.
Figure 2C:
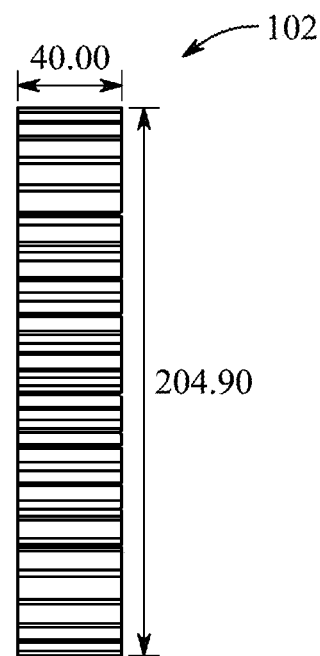
FIG. 2C is an exemplary diagram showing a side elevational view of the toothed ring gear, according to certain embodiments.

FIGS. 2A-2C illustrate different views of the toothed ring gear 102 of the combined material gear 100. The toothed ring gear 102 is the outermost component of the combined material gear 100, and its primary function is to interface with another gear (not shown) in a gear train, either to receive rotational power from that gear or to transmit power to it. This interaction occurs through the meshing of the teeth on the toothed ring gear 102 with the teeth of the mating gear. As shown, the toothed ring gear 102 has a plurality of evenly spaced outer gear teeth 104 located on an outer circumference 106. The term "evenly spaced" indicates that the angular distance between adjacent teeth 104 is constant around the entire circumference 106. This uniformity facilitates smooth and efficient gear operation. The number of outer gear teeth 104, their specific profile (shape), and their size are determined by the specific design requirements of the gear system, including the desired gear ratio (the ratio of the rotational speeds of the input and output shafts) and the characteristics of the mating gear with which the toothed ring gear 102 will interact. The outer gear teeth 104 are designed to mesh smoothly and efficiently with the teeth of the mating gear, minimizing noise, vibration, and wear. The precise geometry of the tooth profile ensures proper contact and load distribution between the engaging gears.

Herein, the toothed ring gear 102 is made of metallic material. The use of a metallic material for the toothed ring gear 102 provides the necessary strength and durability to withstand the high loads and stresses that are concentrated in the teeth during gear operation. The contact points between the meshing teeth experience significant forces, and the metallic material ensures that the toothed ring gear 102 can withstand these forces without deformation or failure. The metallic material also provides wear resistance, ensuring a long operational life for the gear.

The metallic material is selected from a group comprising steel, composite metal, alloy steel, cast iron, copper alloy, carbon steel, tungsten carbide and bronze, wherein the metallic material has a density in a range of about 7 gm/cm$^3$ to about 17 gm/cm$^3$, preferably about 8 gm/cm$^3$ to about 18 gm/cm$^3$, about 9 gm/cm$^3$ to about 15 gm/cm$^3$, about 10 gm/cm$^3$ to about 14 gm/cm$^3$, about 11 gm/cm$^3$ to about 13 gm/cm$^3$. The metallic material may have a density of about 7.5 gm/cm$^3$ or about 15.63 gm/cm$^3$. The metallic material may be a ferrous material such as steel, stainless steel and/or Damascus steel, a nonferrous metal such as aluminum, copper, gold, silver, platinum, titanium, tantalum, cobalt and zirconium and/or an alloy such as brass and bronze. The metallic material is preferably non-porous, electrically and thermally conductive and ductile.

An inner ring 109 of the toothed ring gear 102 is configured with a plurality of evenly spaced inner gear teeth 110 alternating with a plurality of inner gear grooves 112. Herein, the inner ring 109 refers to the portion of the toothed ring gear 102 that lies radially inward, closer to the central axis of the gear. Referring to FIG. 2A, and also FIGS. 2B-2C, it may be seen that the inner ring 109 of the toothed ring gear 102 is configured with a pattern of alternating teeth and grooves. Specifically, the inner ring 109 of the toothed ring gear 102 is configured with a plurality of evenly spaced inner gear teeth 110 alternating with a plurality of inner gear grooves 112. Herein, the plurality of evenly spaced inner gear teeth 110 project radially inward from the inner ring 109 and are interspersed with the plurality of inner gear grooves 112. The term "alternating" indicates that each inner gear tooth 110 is followed by an inner gear groove 112, and this pattern repeats around the entire inner circumference of the toothed ring gear 102. The inner gear teeth 110 and inner gear grooves 112 are designed to engage with corresponding features on the first and second spline gears 116, 116', as will be described in detail later. This engagement provides for transmitting torque and ensuring the proper alignment and positioning of the components within the combined material gear 100. The precise shape and dimensions of the inner gear teeth 110 and inner gear grooves 112 are carefully controlled to ensure a secure and efficient connection with the spline gears.

Further, in the combined material gear 100, a radially extending rib 114 is centrally located within the inner ring 109 of the toothed ring gear 102 between each inner gear tooth 110. As shown most clearly in FIG. 2A, the toothed ring gear 102 incorporates the radially extending rib 114. The radially extending rib 114 is an integral part of the toothed ring gear 102 and is located within the inner ring 109, positioned between each pair of adjacent inner gear teeth 110. The radially extending rib 114 projects inward from the inner ring 109 towards the center of the toothed ring gear 102, following a radial line, and is positioned midway between each pair of inner gear teeth 110, effectively bisecting the inner gear grooves 112.

The radially extending rib 114 serves multiple functions within the combined material gear 100 design. Herein, the radially extending rib 114 provides structural reinforcement to the toothed ring gear 102, by adding rigidity and resistance to deformation, particularly in the radial direction, as required for withstanding the forces generated during gear meshing, which tend to push the teeth apart and deform the gear body. By increasing the stiffness of the toothed ring gear 102, the radially extending rib 114 helps to maintain the geometry of the gear teeth and ensure proper contact with the mating gear, even under high loads. Further, the radially extending rib 114 serves as a locating feature for the first and second spline gears 116, 116'. As will be described later in detail, the spline gears 116, 116' are designed to abut against the radially extending rib 114 when the combined material gear 100 is assembled, which provides an axial positioning of the spline gears 116, 116' relative to the toothed ring gear 102, preventing them from shifting or moving axially during operation. This positioning allows for maintaining proper tooth contact and minimizing stress concentrations.

It may be understood that the present disclosure is also applicable to helical gears, which are similar to spur gears except that their teeth are cut at an angle to the hole (axis) rather than straight and parallel to the hole like the teeth of a spur gear, and the line of contact between two teeth is not parallel to the teeth but inclined. In the case of helical gears, the radially extending rib 114 helps in resisting the axial forces (thrust) that are generated by the helical teeth. These axial forces tend to push the gears apart along the axis of rotation. The radially extending rib 114, by virtue of its radial orientation and rigid construction, provides a counteracting force that prevents this axial movement, maintaining the proper engagement and alignment of the gears. The radially extending rib 114 has specific dimensions that are chosen to optimize its performance, as discussed later in more detail.

Figure 3A:
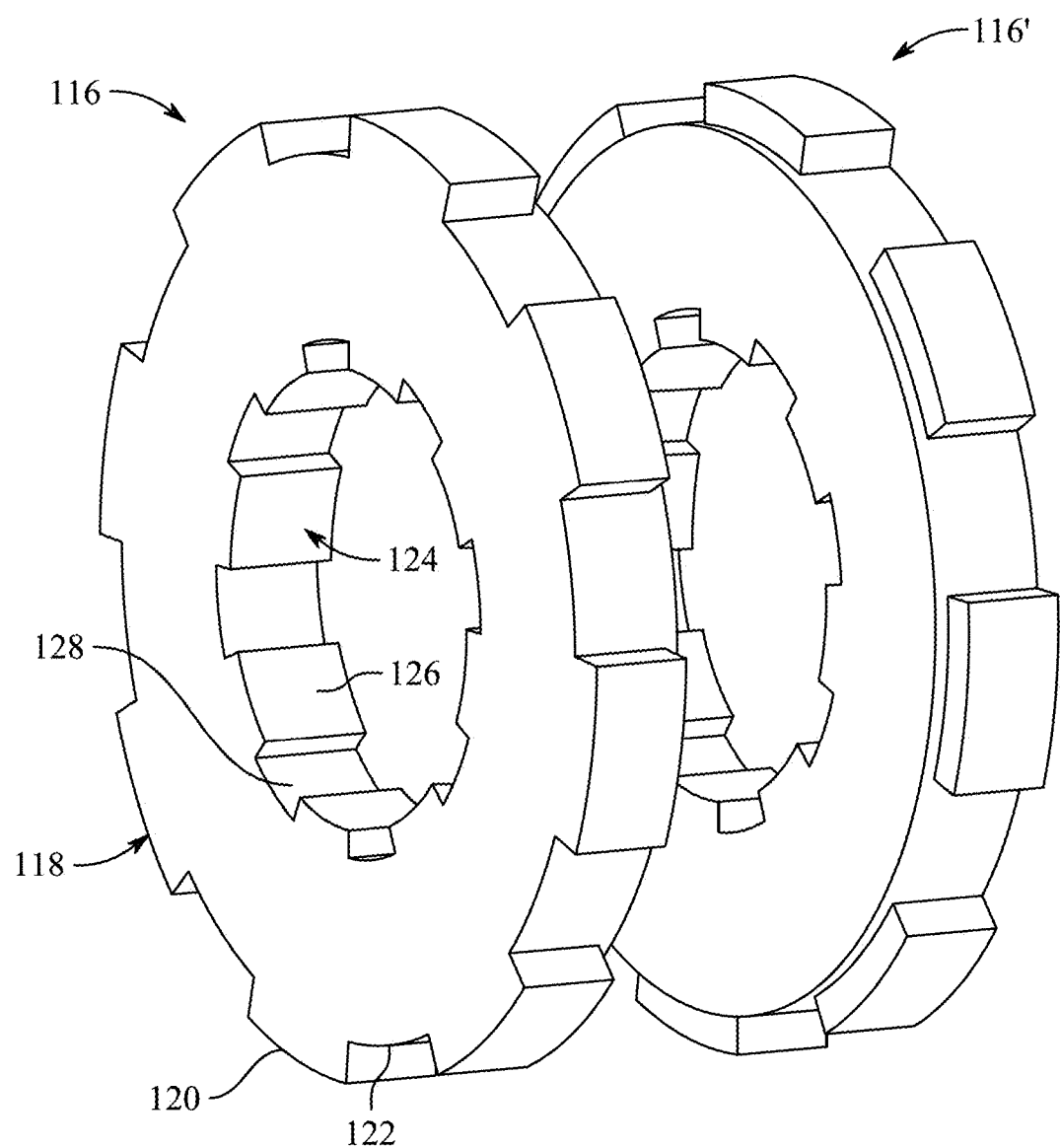
FIG. 3A is an exemplary diagram showing a perspective view of a first spline gear and a second spline gear of the combined material gear, according to certain embodiments.
Figure 3B:
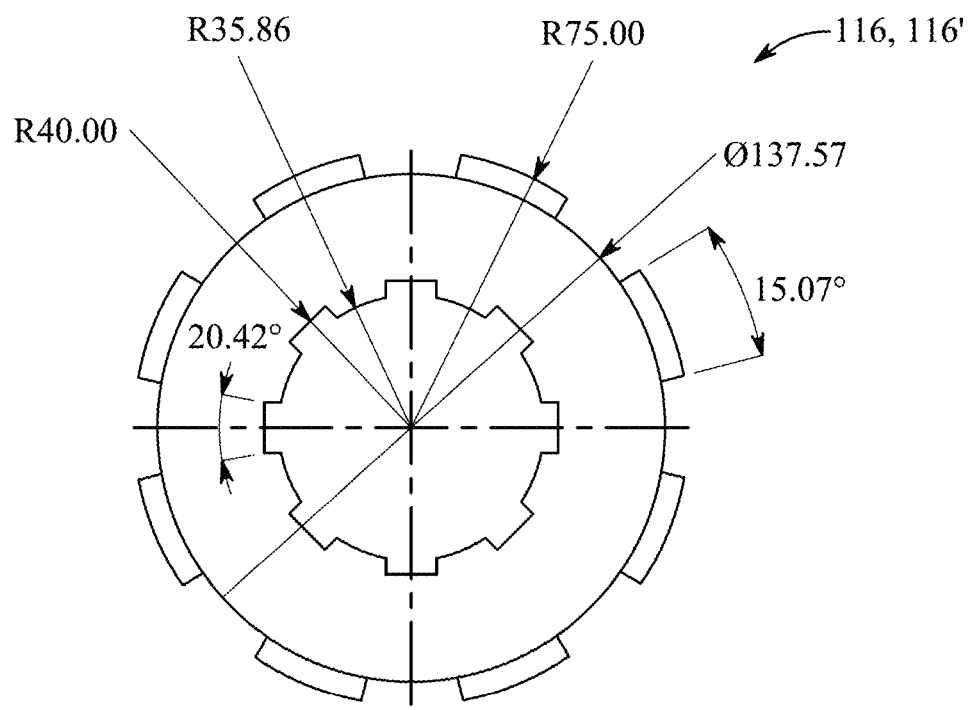
FIG. 3B is an exemplary diagram showing a cross-sectional view with dimensions of one of the first and second spline gear, with other being identical, according to certain embodiments.
Figure 3C:
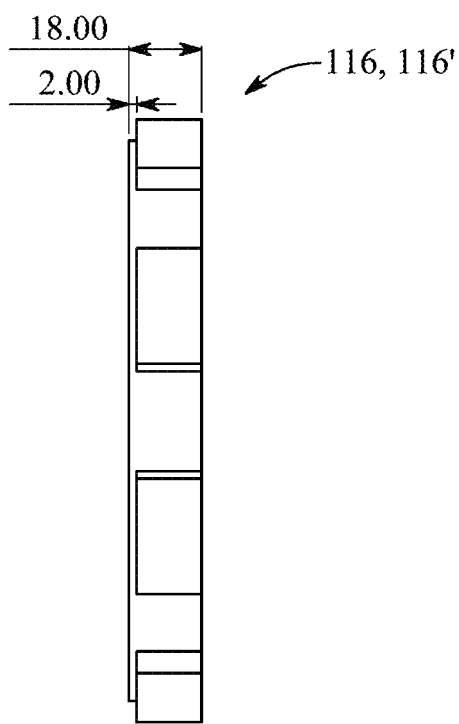
FIG. 3C is an exemplary diagram showing a side elevational view with dimensions of one of the first and second spline gear, with other being identical, according to certain embodiments.

As mentioned, the combined material gear 100 includes the first spline gear 116 and the second spline gear 116'. FIGS. 3A-3C illustrate the first spline gear 116 and the second spline gear 116'. The spline gears 116, 116' serve as intermediary components, positioned between the toothed ring gear 102 and the flanged hub 130. Each of the first and second spline gears 116, 116' is characterized by a specific geometry designed for engagement with both the toothed ring gear 102 and the flanged hub 130. Their primary functions are to transmit torque between these components and, due to their material properties, to provide damping and accommodate some degree of misalignment within the gear system. Because the first and second spline gears 116, 116' are identical in configuration, they are described together in the proceeding paragraphs without any limitations.

As illustrated, the first spline gear 116 and the second spline gear 116' are configured with an outer circumference 118 comprising a plurality of evenly spaced outer spline teeth 120 alternating with a plurality of outer spline grooves 122. The term "evenly spaced" signifies that the angular distance between adjacent outer spline teeth 120 is constant around the entire outer circumference 118. This uniformity provides for proper meshing with the toothed ring gear 102. The outer spline teeth 120 are projections that extend radially outward from the main body of the corresponding spline gear. The outer spline grooves 122 are the spaces or recesses between adjacent outer spline teeth 120. The outer spline teeth 120 are specifically configured to fit within the inner gear grooves 112 of the toothed ring gear 102. This fit is designed to be precise, with minimal clearance between the teeth and grooves, to ensure a secure connection and minimize backlash (unwanted free play).

Further, the first spline gear 116 and the second spline gear 116' are configured with an inner ring 124 comprising a plurality of evenly spaced inner spline teeth 126 alternating with a plurality of inner spline grooves 128. This inner ring 124 comprises a plurality of evenly spaced inner spline teeth 126 that project radially inward, alternating with a plurality of inner spline grooves 128. These inner spline teeth 126 and inner spline grooves 128 are designed to engage with corresponding features on the flanged hub 130, as will be described subsequently. This engagement provides the means for transmitting torque between the spline gears 116, 116' and the flanged hub 130, which, in turn, is connected to the shaft 108.

Herein, specifically, the outer spline teeth 120 are configured to fit in the inner gear grooves 112 of the toothed ring gear 102 and abut the radially extending rib 114 when the first spline gear 116 is assembled to a first side of the toothed ring gear 102. Similarly, the outer spline teeth 120 of the second spline gear 116' are configured to fit in the inner gear grooves 112 of the toothed ring gear 102 and abut the radially extending rib 114 when the second spline gear 116' is assembled to a second side of the toothed ring gear 102. That is, when the first spline gear 116 is assembled to the first side of the toothed ring gear 102 (as depicted in the assembly view of FIG. 1), the outer spline teeth 120 are designed to abut against the radially extending rib 114 of the toothed ring gear 102. This abutment provides a positive axial stop for the spline gear 116, preventing it from moving axially along the axis of rotation relative to the toothed ring gear 102. This axial constraint ensures that the proper tooth contact is maintained and that the gears do not disengage during operation. Similarly, when the second spline gear 116' is assembled to the second, opposite side of the toothed ring gear 102, its outer spline teeth 120 also abut against the radially extending rib 114. This provides the same axial constraint for the second spline gear 116', ensuring that both spline gears are securely positioned relative to the toothed ring gear 102.

In present aspects, the first spline gear 116 and the second spline gear 116' are made of one of a thermoplastic material and a powder metal material. That is, distinguishing from the toothed ring gear 102 and the flanged hub 130, the first spline gear 116 and the second spline gear 116' are made of either the thermoplastic material or the powder metal material. This material selection is a defining characteristic of the combined material gear 100 design and is a key factor in achieving its desired balance of properties. The use of a material that is different from the metallic material of the toothed ring gear 102 and the flanged hub 130 allows for the incorporation of beneficial properties that are not typically associated with metals, such as enhanced damping and self-alignment capabilities. The choice between a thermoplastic material and a powder metal material depends on the specific application requirements and the desired trade-offs between various performance characteristics. In particular, the choice between a thermoplastic material and a powder metal material depends on the specific application requirements, the anticipated loads, the operating environment, and the desired balance between strength, damping, weight, and cost.

Specifically, herein, thermoplastic materials, such as polyamide resins (e.g., MC Nylon) and polyacetal plastics, provide excellent damping characteristics. This means they can absorb vibrations and reduce noise during gear operation, leading to a quieter and smoother-running system. Thermoplastics also possess inherent self-aligning capabilities. Due to their lower stiffness compared to metals, they can accommodate minor misalignments between the toothed ring gear 102 and the flanged hub 130 without generating excessive stresses. This self-alignment can compensate for manufacturing tolerances and assembly errors, improving the overall robustness of the gear system. Furthermore, thermoplastic materials are generally lighter than metals, contributing to a reduction in the overall weight of the combined material gear 100. This weight reduction can be beneficial in applications where weight is a critical factor, such as in automotive or aerospace applications. Finally, thermoplastic materials are often less expensive than high-strength metals, potentially leading to cost savings in the manufacturing of the combined material gear 100.

Powder metal materials, on the other hand, offer a different set of advantages. Powder metal parts are created through a process called sintering, where metal powders are compacted under high pressure and then heated to bond the particles together. This process allows for the creation of complex shapes with good dimensional accuracy. Powder metal materials, such as brass, bronze, carbon steel, alloy steel, stainless steel, and cast iron, offer a good balance between strength, durability, and cost. While not as strong as solid steel, they can provide sufficient strength for the spline gear application, where the stresses are generally lower than in the toothed ring gear 102. The inherent porosity of powder metal parts, a result of the manufacturing process, can contribute to damping and noise reduction, similar to thermoplastic materials.

In present configuration, the size and dimensions of the first and second spline gears 116, 116', as well as the specific choice of material (thermoplastic or powder metal), are determined based on the overall gear design and the anticipated applied load. The design process considers the expected stress distribution within the combined material gear 100. In general, higher stresses are concentrated in the teeth area of the toothed ring gear 102 (where the outer gear teeth 104 mesh with another gear) and in the vicinity of the hub (where the inner spline teeth 126 connect to the flanged hub 130). Therefore, these high-stress areas are typically made of the stronger metallic material. The spline gears 116, 116', which experience relatively lower stresses, can be made of the thermoplastic or powder metal material. This strategic use of different materials allows for optimization of performance, weight, and cost for the gear system.

Further, the manufacturing methods for the first and second spline gears 116, 116' depend on the chosen material. If a thermoplastic material is selected, injection molding is a common and highly efficient manufacturing process. Injection molding involves heating the thermoplastic material until it becomes molten and then injecting it under high pressure into a precisely shaped mold cavity. The molten plastic fills the cavity, taking on the shape of the spline gear, including the outer spline teeth 120, the outer spline grooves 122, the inner spline teeth 126, and the inner spline grooves 128. The plastic then cools and solidifies within the mold, after which the finished spline gear is ejected. Injection molding is well-suited for high-volume production and allows for the creation of complex geometries with tight tolerances, making it an ideal choice for manufacturing thermoplastic spline gears.

Alternative methods for manufacturing plastic parts include hobbing and 3-D printing when thermoplastic materials are utilized. Hobbing is a machining process that employs a specialized milling machine to cut gear teeth, splines, and similar features into a thermoplastic blank. In the hobbing process, a thermoplastic gear blank is secured in a hobbing machine, and a cutting tool known as a hob rotates in coordination with the gear blank. The teeth of the hob progressively cut into the thermoplastic blank, creating the desired tooth profile of the first spline gear or the second spline gear. Hobbing provides high dimensional accuracy and surface finish quality for thermoplastic components, though the process generates more material waste compared to injection molding. 3D printing, also referred to as additive manufacturing, process builds thermoplastic components layer by layer according to a digital model, allowing for complex geometries that might be difficult to achieve through conventional manufacturing methods. The selection among injection molding, hobbing and 3D printing depends on factors including production volume, required precision, material properties, and economic considerations for the specific application of the combined material gear.

If a powder metal material is selected, the manufacturing process involves sintering, as previously described. The process begins with the mixing of metal powders to achieve the desired composition. This powder mixture is then placed in a die that has the precise shape of the spline gear, including all the intricate details of the outer and inner teeth and grooves. High pressure is applied to compact the powder mixture within the die, forming a "green compact" that has the desired shape but lacks the full strength of a finished part. The green compact is then carefully removed from the die and placed in a controlled atmosphere furnace. The compact is heated (sintered) to a temperature below the melting point of the main constituent metal. This high temperature causes the metal particles to bond together through diffusion, creating a solid and strong part with the desired shape and dimensions. The sintering process parameters, such as temperature, time, and atmosphere, are carefully controlled to achieve the desired density, strength, and other properties of the finished powder metal spline gear.

In aspects of the present disclosure, the combined material gear 100 further includes a locking assembly configured to lock the first spline gear 116 and the second spline gear 116' to the toothed ring gear 102. The locking assembly, as previously described, comprises the flanged hub 130 and the threaded disc 134. The locking assembly allows for maintaining the structural integrity of the combined material gear 100 and ensuring its proper function. The locking assembly securely connects the first and second spline gears 116, 116' to the toothed ring gear 102, preventing any relative axial movement (movement along the axis of rotation) between these components during operation. It may be appreciated that if such movement were to occur, it could lead to disengagement of the gears, improper tooth contact, increased stress concentrations, and ultimately, failure of the gear system.

Each of the flanged hub 130 and the threaded disc 134 are made of metallic material. The use of metallic materials for both the flanged hub 130 and the threaded disc 134 is a deliberate design choice. Metallic materials, such as steel, offer the required strength and rigidity to withstand the clamping forces generated by the locking assembly and the operational loads transmitted through the gear system. The choice of the same metallic material for both components (preferably steel, as used for the toothed ring gear 102) ensures compatibility and minimizes potential issues related to differing thermal expansion coefficients.

The metallic material is selected from a group comprising steel, composite metal, alloy steel, cast iron, copper alloy, carbon steel, tungsten carbide and bronze, wherein the metallic material has a density in a range of about 7 $gm/cm^3$ to about 17 $gm/cm^3$, preferably about 8 $gm/cm^3$ to about 18 $gm/cm^3$, about 9 $gm/cm^3$ to about 15 $gm/cm^3$, about 10 $gm/cm^3$ to about 14 $gm/cm^3$, about 11 $gm/cm^3$ to about 13 $gm/cm^3$. The metallic material may have a density of about 7.5 $gm/cm^3$ or about 15.63 $gm/cm^3$. The metallic material may be a ferrous material such as steel, stainless steel and/or Damascus steel, a nonferrous metal such as aluminum, copper, gold, silver, platinum, titanium, tantalum, cobalt and zirconium and/or an alloy such as brass and bronze. The metallic material is preferably non-porous, electrically and thermally conductive and ductile.

In the flanged hub 130, the flange 131 of the hub 132 is configured to face the first spline gear 116 and the toothed ring gear 102. As seen in the assembled view of FIG. 1, the flange 131, which is the wider, disc-like portion of the flanged hub 130, is positioned so that it faces the first spline gear 116 and, beyond that, the toothed ring gear 102. This arrangement allows the flange 131 to act as a large bearing surface, making direct contact with the face of the first spline gear 116. This contact allows for distributing the clamping force evenly and preventing localized stresses. The hub portion 132 of the flanged hub 130 is the cylindrical, elongated part that projects from the flange 131. This hub portion 132 is designed to pass through the central openings (inner rings) of all three primary components: the first spline gear 116, the toothed ring gear 102, and the second spline gear 116'. Specifically, the hub 132 of the flanged hub 130 is configured to extend through the inner ring 124 of the first spline gear 116, the inner ring 109 of the toothed ring gear 102 and the inner ring 124 of the second spline gear 116'. This through-hole arrangement ensures that these components are coaxially aligned, sharing a common central axis, for the smooth and efficient operation of the gear system.

Further, the threaded disc 134 is configured to engage with a set of inner threads 138 of the flanged hub 130 to lock the first spline gear 116 and the second spline gear 116' within the inner ring 109 of the toothed ring gear 102. The threaded disc 134, as shown in FIG. 5A, has external threads 136 that are designed to mate with the internal threads 138 on the hub portion 132 of the flanged hub 130 (visible in FIG. 4A). This threaded engagement provides the clamping force to hold the gear assembly together. As the threaded disc 134 is tightened onto the flanged hub 130, it advances axially along the hub portion 132. Because the flange 131 of the flanged hub 130 is facing the first spline gear 116, and the threaded disc 134 is on the opposite side, this tightening action draws the first and second spline gears 116, 116' towards the toothed ring gear 102. This effectively clamps the spline gears 116, 116' between the flange 131 and the threaded disc 134, securely locking them within the inner ring 109 of the toothed ring gear 102. This locking action prevents any relative axial movement of the components, ensuring the structural integrity and proper function of the combined material gear 100 under operational loads.

Figure 4A:
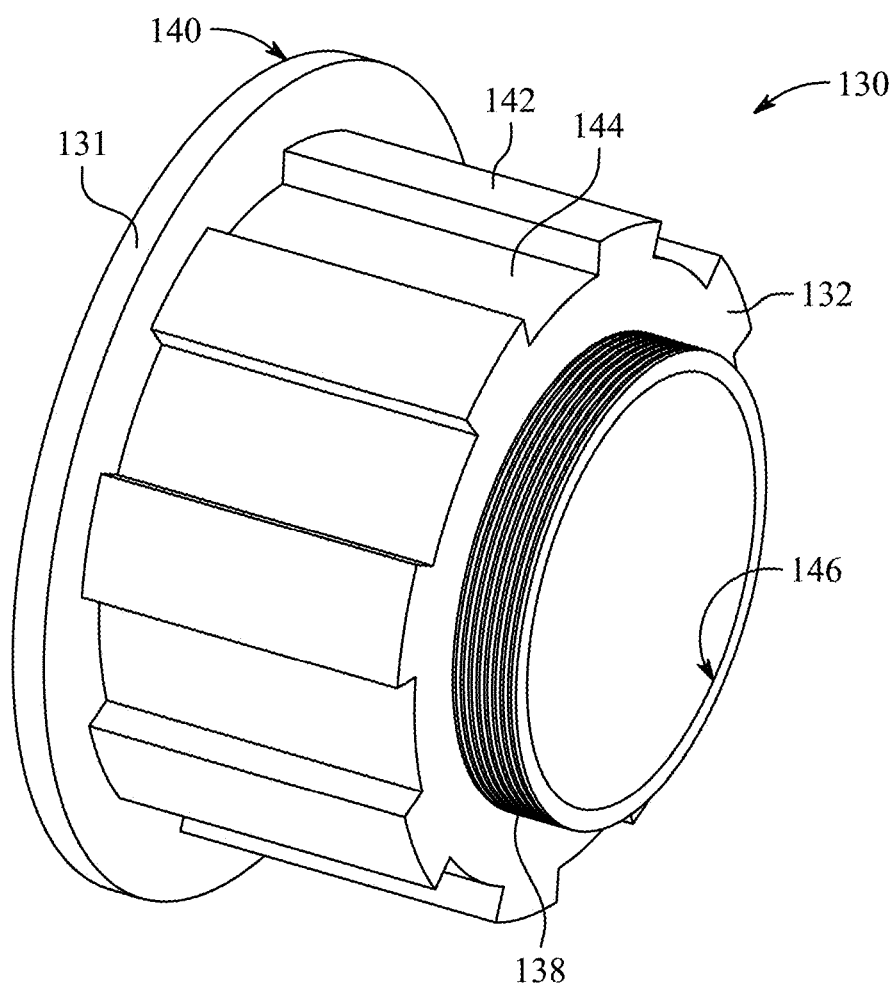
FIG. 4A is an exemplary diagram showing a perspective view of a flanged hub of the combined material gear, according to certain embodiments.
Figure 4B:
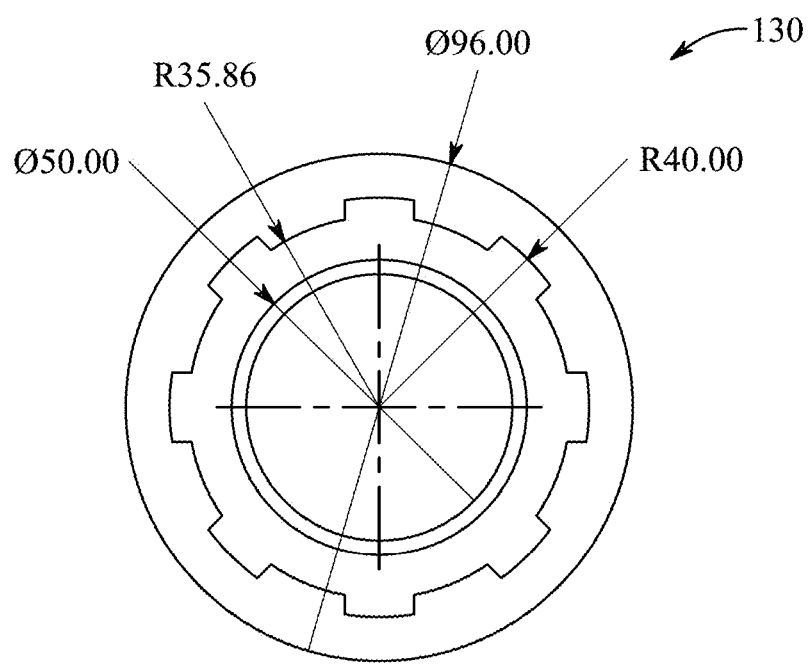
FIG. 4B is an exemplary diagram showing a top plan view with dimensions of the flanged hub, according to certain embodiments.
Figure 4C:
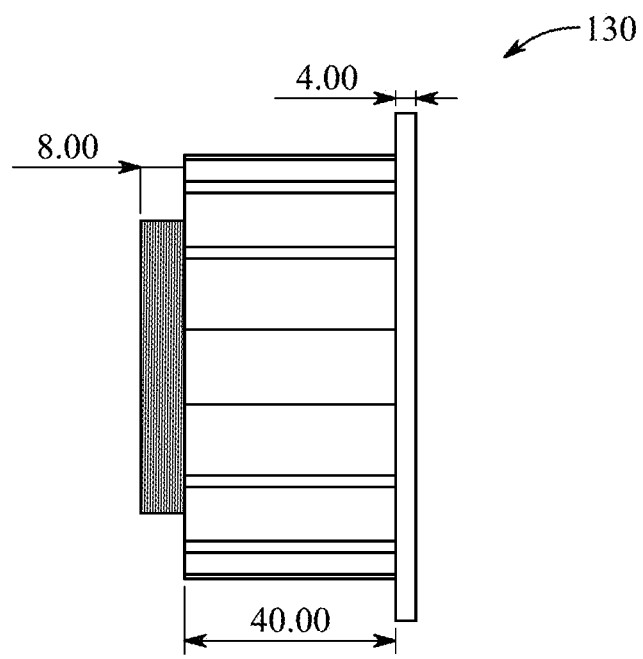
FIG. 4C is an exemplary diagram showing a side elevational view with dimensions of the flanged hub, according to certain embodiments.
Figure 5A:
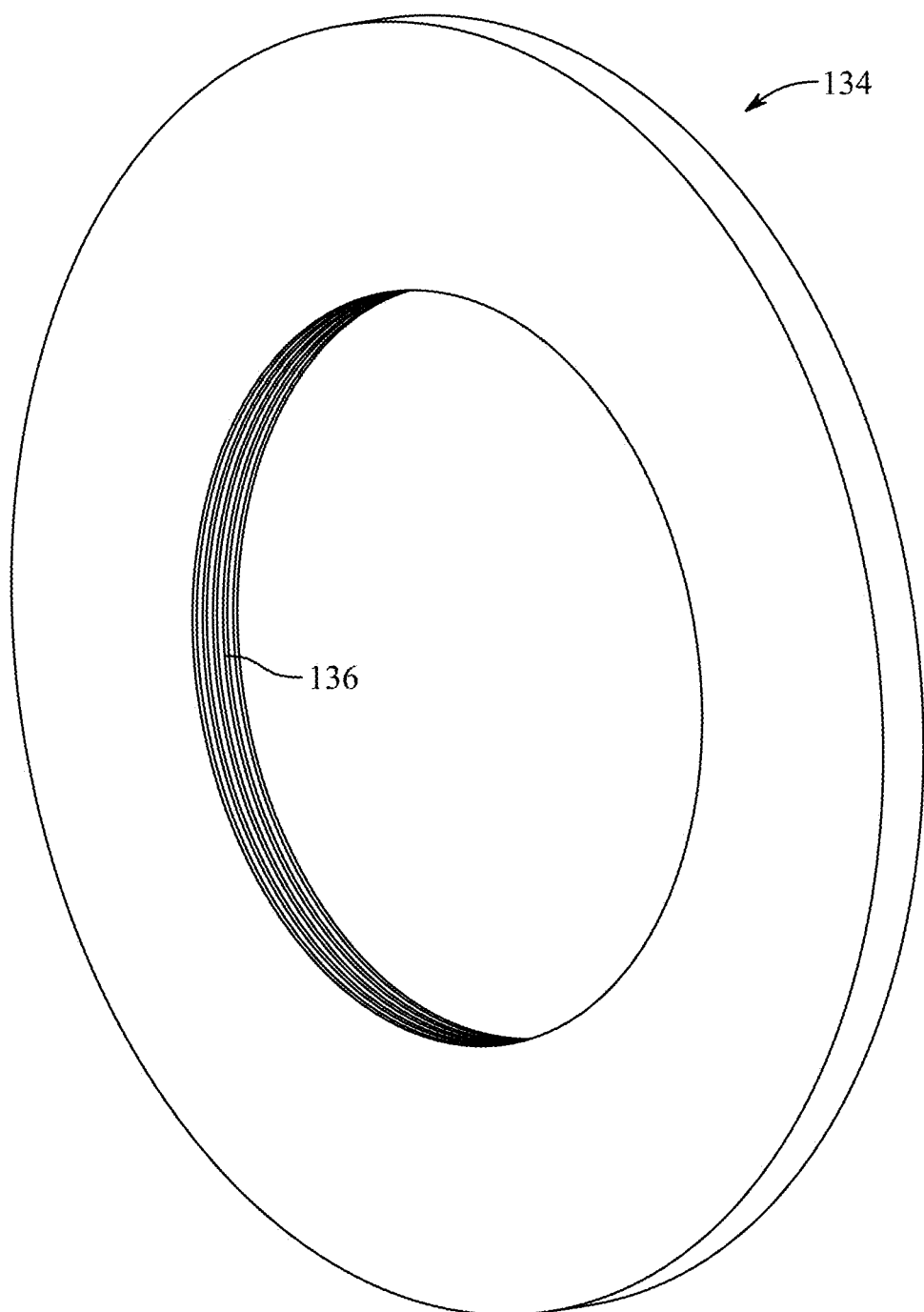
FIG. 5A is an exemplary diagram showing a perspective view of a threaded disc of the combined material gear, according to certain embodiments.
Figure 5B:
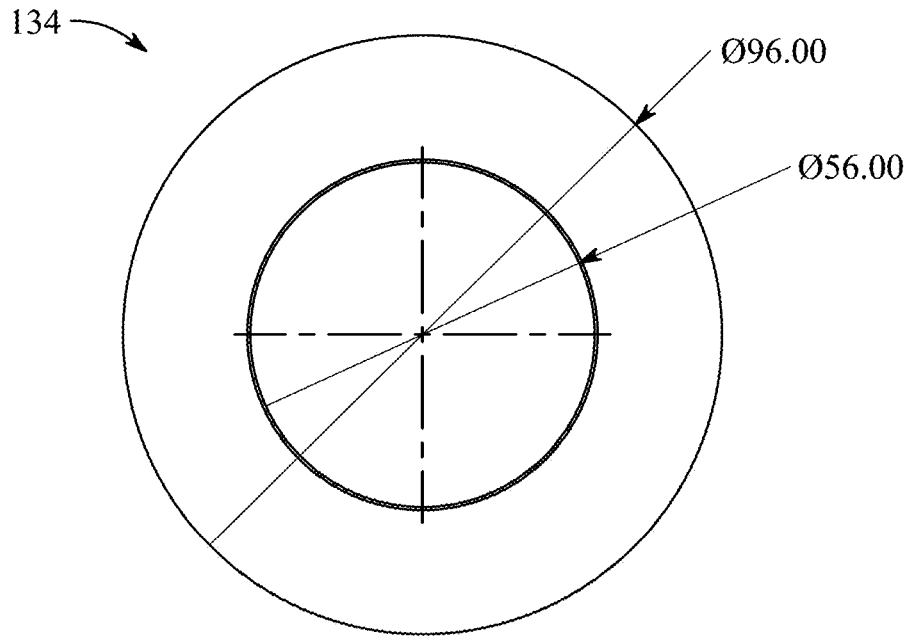
FIG. 5B is an exemplary diagram showing a top plan view with dimensions of the threaded disc, according to certain embodiments.
Figure 5C:
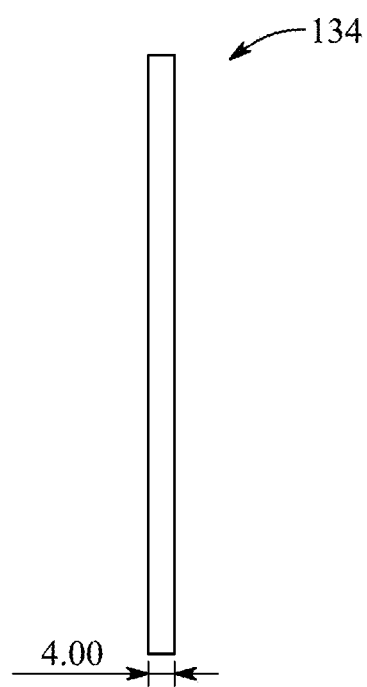
FIG. 5C is an exemplary diagram showing a side elevational view with dimension of the threaded disc, according to certain embodiments.
Figure 6:
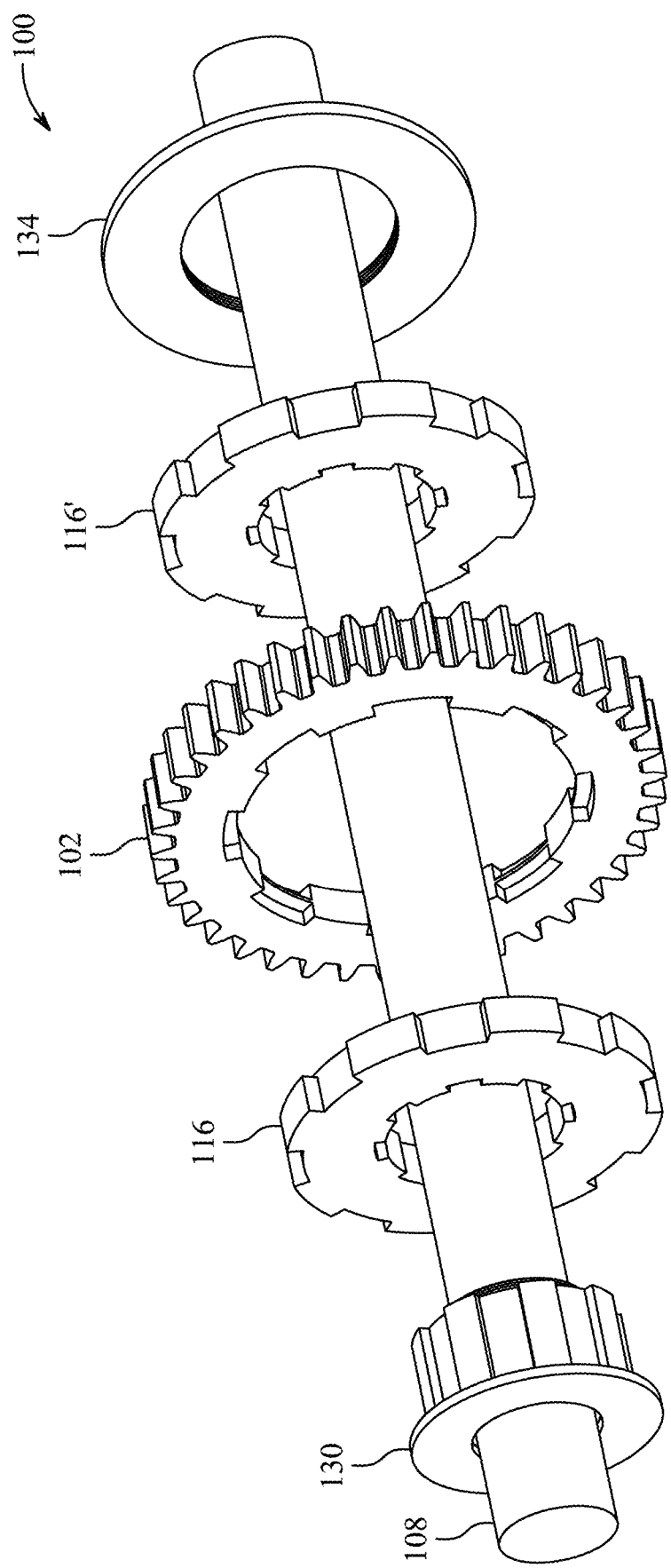
FIG. 6 is an exemplary exploded diagram of the combined material gear, according to certain embodiments.

In an aspect, the flanged hub 130, as shown in FIG. 4A, includes an outer circumference 140 configured with a plurality of evenly spaced hub teeth 142 alternating with a plurality of hub grooves 144. The hub teeth 142 and the hub grooves 144 facilitate the transmission of torque within the combined material gear 100. The outer circumference 140 of the flanged hub 130 is the cylindrical surface that extends from the flange 131 along the hub portion 132. This surface features a series of evenly spaced projections (i.e., the hub teeth 142) and recesses (i.e., the hub grooves 144). The evenly spaced characteristic ensures that the angular distance between adjacent hub teeth 142 is constant around the entire outer circumference 140, as required for proper meshing with the spline gears.

Herein, the plurality of evenly spaced hub teeth 142 and the plurality of hub grooves 144 are configured to mesh with the plurality of evenly spaced inner spline teeth 126 and the plurality of inner spline grooves 128 of the first and second spline gears 116, 116'. This meshing engagement, as may be seen in the assembly view of FIG. 1, transmits rotational motion and torque between the flanged hub 130 and the spline gears 116, 116'. The hub teeth 142 of the flanged hub 130 are designed to fit within the inner spline grooves 128 of the spline gears 116, 116'. Simultaneously, the hub grooves 144 of the flanged hub 130 accommodate the inner spline teeth 126 of the spline gears 116, 116'. This interlocking connection creates a positive drive, so that there is no slippage between the flanged hub 130 and the spline gears 116, 116' during operation, thus ensuring that all the torque applied to the flanged hub 130 (presumably from a shaft connected to thereto) is transmitted efficiently to the spline gears 116, 116', and subsequently to the toothed ring gear 102.

The flanged hub 130 further includes an inner hub ring 146 configured to receive a shaft 108. The inner hub ring 146 is a central bore or cylindrical opening that extends through the entire flanged hub 130, from the flange 131 to the opposite end of the hub portion 132. This inner hub ring 146 is specifically designed to accommodate the shaft 108, which, as previously mentioned, represents either the input or output shaft of the gear system. The inner hub ring 146 may incorporate various features to ensure a secure connection with the shaft 108, such as, but not limited to, splines (longitudinal ridges and grooves) that mate with corresponding splines on the shaft, keyways (slots that accommodate a key to prevent rotation), or a press-fit configuration, where the inner diameter of the hub ring 146 is slightly smaller than the outer diameter of the shaft 108, creating a tight interference fit when the two are assembled. The method of connection may depend on the specific design requirements and the anticipated loads. This connection between the inner hub ring 146 and the shaft 108 transmits rotational motion and power between the shaft 108 and the combined material gear 100, completing the power transmission pathway.

In an aspect, the inner gear teeth 110, the outer spline teeth 120 of the first spline gear 116 and the second spline gear 116', the inner spline teeth 126 of the first spline gear 116 and the second spline gear 116' and the hub teeth 142 are spur teeth having straight sides parallel to a face of the toothed ring gear 102. This configuration specifies a spur teeth type of tooth profile for all the engaging teeth within the combined material gear 100. Spur teeth are the simplest and most common type of gear teeth, and are characterized by their straight sides, which, when viewed in a cross-section perpendicular to the axis of rotation, appear as straight lines. These straight sides are parallel to a face of the toothed ring gear 102. Since the toothed ring gear 102 is mounted coaxially with the shaft 108, the straight sides of the spur teeth are also parallel to the axis of rotation of the combined material gear 100.

The use of spur teeth throughout the combined material gear 100, i.e., for the inner gear teeth 110 of the toothed ring gear 102, the outer spline teeth 120 of the first and second spline gears 116, 116', the inner spline teeth 126 of the first and second spline gears 116, 116', and the hub teeth 142 of the flanged hub 130, creates a consistent and relatively simple gear system design. This uniformity in tooth profile simplifies the design calculations, manufacturing processes, and assembly procedures. Spur gears are generally easier and less expensive to manufacture compared to other gear types, such as helical gears. Their straight-sided profiles can be readily produced using standard machining processes like milling or hobbing. This ease of manufacture can translate to lower production costs, making spur gears an attractive option for many applications. Further, spur gears, due to their parallel-sided teeth, do not inherently generate any axial forces during operation. This simplifies the design of the gear system, as there is no need for additional components, such as thrust bearings, to counteract these forces.

Alternatively, the inner gear teeth 110, the outer spline teeth 120 of the first spline gear 116 and the second spline gear 116', the inner spline teeth 126 of the first spline gear 116 and the second spline gear 116' and the hub teeth 142 are helical teeth set at an angle with respect to a face of the toothed ring gear 102. This configuration uses a helical teeth tooth profile option for the engaging teeth within the combined material gear 100. Helical teeth, unlike spur teeth, are not straight-sided, and instead are cut at an angle (known as the helix angle) relative to the face of the toothed ring gear 102 and, consequently, relative to the axis of rotation of the gear system.

The use of helical teeth for all the engaging teeth, i.e., the inner gear teeth 110 of the toothed ring gear 102, the outer spline teeth 120 of the first and second spline gears 116, 116', the inner spline teeth 126 of the first and second spline gears 116, 116', and the hub teeth 142 of the flanged hub 130, results in smoother and quieter operation due to the gradual engagement of the teeth. As a helical gear rotates, the contact between mating teeth begins at one end of the tooth and progressively moves across the tooth face, rather than occurring simultaneously across the entire tooth width, as is the case with spur gears. This gradual engagement reduces impact forces and vibration, resulting in a quieter and more efficient gear system. The smoother operation of helical gears makes them particularly well-suited for high-speed applications and situations where noise reduction is a priority.

It may be noted that the angled orientation of helical teeth leads to the generation of axial forces. Because the teeth are not parallel to the axis of rotation, a component of the force transmitted between the teeth acts along the axis of the gear. This axial force, also known as thrust, may need to be accommodated by the design of the gear system. In the combined material gear 100, the radially extending rib 114 on the toothed ring gear 102 (as shown in FIG. 2A) serves this purpose. The rib 114 provides a strong, rigid structural element that counteracts the thrust generated by the helical teeth, preventing axial movement of the gears and maintaining proper alignment.

When helical teeth are used, the angle is selected from a group comprising about 5 degrees to about 20 degrees. This specified range for the helix angle represents a balance for the helical gears. A smaller helix angle (closer to 5 degrees) results in a less pronounced helical effect. The teeth are closer to being straight, so the advantages of smoothness and quietness are less significant compared to a larger helix angle. However, the axial forces generated are also smaller, reducing the demands on the axial support mechanism (such as the radially extending rib 114 in the combined material gear 100). This configuration would be suitable for typical applications where the loads are moderate and noise reduction is not a primary concern. Further, a larger helix angle (closer to 20 degrees) provides a more significant helical effect. The teeth are more angled, leading to greater smoothness and quieter operation compared to a smaller helix angle. This is because the contact between mating teeth progresses more gradually across the tooth face. Therefore, the specific helix angle chosen within the 5 to 20-degree range depends on a consideration of the application requirements, the anticipated loads, the desired level of smoothness and quietness, and the manufacturing capabilities.

In some aspects, the combined material gear 100 further comprises a glue layer (not shown) between each of the plurality of inner gear teeth 110 and outer spline grooves 122, the inner gear grooves 112 and the outer spline teeth 120, the inner spline teeth 126 and the hub grooves 144, and the inner spline grooves 128 and the hub teeth 142. The glue layer acts as an adhesive, bonding the mating surfaces of the teeth and grooves together. This creates a more unified and integrated structure, enhancing the overall strength and stability of the gear assembly. The adhesive bond helps to prevent any relative movement or slippage between the components, even under high loads or vibrations.

The glue layer may also contribute to improved self-alignment capabilities. By filling in any microscopic gaps or imperfections between the mating surfaces of the teeth and grooves, the glue layer allows for a more even distribution of contact stresses. This reduces stress concentrations that could otherwise lead to premature wear or failure of the gear components. The ability of the glue layer to accommodate slight misalignments or manufacturing tolerances makes the combined material gear 100 less sensitive to variations in assembly. Furthermore, the glue layer provides damping, which is the ability to absorb and dissipate energy from vibrations. The glue material, by its nature, is less stiff than the metal or thermoplastic components of the gear system. This lower stiffness allows the glue layer to deform slightly under vibration, converting the vibrational energy into heat and reducing the overall noise and vibration levels of the gear system.

In present examples, the glue layer is formed from a glue selected from a group comprising thermoplastic rubber, thermoplastic olefin, acetal and polyamide, and thermoset materials such as epoxies, acetals, vulcanized rubber, bakelite, duroplast, urea formaldehyde, silicones, polyurethanes and polyimides. These materials are specifically chosen for their compatibility with the other materials in the combined material gear 100 (metals, thermoplastics, and potentially powder metals) and for their desirable combination of properties. Thermoplastic rubber and thermoplastic olefin are particularly well-known for their excellent damping characteristics and flexibility and can effectively absorb vibrations and accommodate small movements without cracking or losing adhesion. Acetal and polyamide are engineering thermoplastics that offer good adhesive strength, dimensional stability, and resistance to chemicals and wear, and provide a more rigid bond compared to thermoplastic rubber or olefin. The choice of a specific glue from this group depends on the particular application requirements, the operating environment (temperature, exposure to chemicals, etc.), and the desired balance between adhesion, damping, and durability.

In the combined material gear 100, each one of the inner gear teeth 110, the outer spline teeth 120 of the first spline gear 116 and the second spline gear 116' and the hub teeth 142 have a radial length of about 6.25 mm. The radial length, in the context of gear teeth, refers to the distance from the base of the tooth (where it joins the main body of the gear or hub) to its tip, measured along a radial line extending from the center of the gear or hub. This dimension defines a key geometric parameter of the engaging teeth within the combined material gear 100, determining the overall size, load-carrying capacity, and operating characteristics of the gear system. The specified radial length of approximately 6.25 mm applies uniformly to all the primary engaging teeth: the inner gear teeth 110 of the toothed ring gear 102, the outer spline teeth 120 of the first and second spline gears 116, 116', and the hub teeth 142 of the flanged hub 130. This uniformity in radial length simplifies the design and ensures consistent meshing engagement between the various components. It may be noted that the given value is exemplary only, and the actual radial length in a specific implementation of the combined material gear 100 could be varied depending on the specific design requirements.

Further, in the combined material gear 100, the radially extending rib 114 has a radial length of about 4 mm. This dimension defines the extent to which the radially extending rib 114 projects inward from the inner ring 109 of the toothed ring gear 102. The radially extending rib 114, as previously discussed and clearly illustrated in FIG. 2A, is positioned centrally between each pair of inner gear teeth 110. The radial length of the rib 114, similar to the radial length of the teeth, is measured from its base (where it joins the inner ring 109) to its innermost tip, along a radial line extending from the center of the toothed ring gear 102. It may be understood that the functions of the radially extending rib 114 are to provide structural reinforcement to the toothed ring gear 102 and to act as a locating feature for the first and second spline gears 116, 116'. The specified radial length of the rib 114 is chosen to provide sufficient structural support and locating capability without unduly increasing the weight or size of the toothed ring gear 102.

Furthermore, in the combined material gear 100, the metallic material is selected from a group comprising steel, composite metal, alloy steel, cast iron, copper alloy, carbon steel, tungsten carbide and bronze, wherein the metallic material has a density in a range of about 7 gm/cm$^3$ to about 17 gm/cm$^3$, preferably about 8 gm/cm$^3$ to about 18 gm/cm$^3$, about 9 gm/cm$^3$ to about 15 gm/cm$^3$, about 10 gm/cm$^3$ to about 14 gm/cm$^3$, about 11 gm/cm$^3$ to about 13 gm/cm$^3$. The metallic material may have a density of about 7.5 gm/cm$^3$ or about 15.63 gm/cm$^3$. The metallic material may be a ferrous material such as steel, stainless steel and/or Damascus steel, a nonferrous metal such as aluminum, copper, gold, silver, platinum, titanium, tantalum, cobalt and zirconium and/or an alloy such as brass and bronze. The metallic material is preferably non-porous, electrically and thermally conductive and ductile. As discussed, in the combined material gear 100, the toothed ring gear 102, the flanged hub 130, and the threaded disc 134 are made of metallic materials, as these are subjected to the highest stresses and therefore require materials with high strength and durability. The listed materials offer a variety of properties to suit different application requirements. Herein, steel offers a good balance of strength, toughness, manufacturability, and cost-effectiveness. Different types of steel (e.g., carbon steel, alloy steel) can be selected and heat-treated to achieve specific desired properties, such as hardness and wear resistance. Composite metal refers to materials composed of two or more distinct constituent materials, often combined to achieve properties superior to those of the individual components. Alloy steel contains additional alloying elements (e.g., chromium, nickel, molybdenum) in addition to iron and carbon, which enhance specific properties, such as strength, hardness, wear resistance, corrosion resistance, or high-temperature performance. Cast iron is a relatively inexpensive material with good wear resistance and damping capacity (ability to absorb vibrations). Copper alloy, such as brass (copper-zinc) and bronze (copper-tin), offer good corrosion resistance and, in some cases, good wear resistance. Carbon steel offers good strength and toughness. Tungsten carbide is a hard and wear-resistant material, often used in applications requiring high durability and resistance to abrasion. Bronze, which is an alloy of copper and tin, is known for its good strength, wear resistance, and corrosion resistance, particularly in marine environments. The metallic material is further characterized by its density, which is specified to be in the range of about 7 gm/cm$^3$ to about 17 gm/cm$^3$, preferably about 8 gm/cm$^3$ to about 18 gm/cm$^3$, about 9 gm/cm$^3$ to about 15 gm/cm$^3$, about 10 gm/cm$^3$ to about 14 gm/cm$^3$, about 11 gm/cm$^3$ to about 13 gm/cm$^3$. The metallic material may have a density of about 7.5 gm/cm$^3$ or about 15.63 gm/cm$^3$. This range reflects the relatively high density of metallic materials compared to, for example, thermoplastic materials. The density of the material is an important factor in determining the overall weight of the combined material gear 100. The specific choice of metallic material depends on a careful consideration of the application requirements, the anticipated loads, the operating environment, and the desired balance between performance, cost, and manufacturability.

In some examples, the metallic material is steel and has a density of about 7.85 gm/cm$^3$. Steel is a ubiquitous material in engineering applications, and particularly in gear systems, due to its excellent combination of properties and cost-effectiveness. Steel is a well-established and reliable material for gear applications, offering predictable performance and readily available manufacturing processes. Different types of steel can be chosen and heat-treated to achieve specific hardness and strength requirements. The specified density is a typical value for many common types of steel, including carbon steels and low-alloy steels. This density provides a good balance between strength and weight. In general, the present selection of steel as the preferred metallic material prioritizes strength, durability, manufacturability, and cost-effectiveness.

Furthermore, in the combined material gear 100, the thermoplastic material is selected from a group comprising a polyamide resin and a polyacetal plastic, wherein the thermoplastic material has a density of about 0.9 gm/cm$^3$ to about 1.5 gm/cm$^3$, about 0.95 gm/cm$^3$ to about 1.45 gm/cm$^3$, about 1.0 gm/cm$^3$ to about 1.4 gm/cm$^3$, about 1.2 gm/cm$^3$ to about 1.3 gm/cm$^3$, or about 0.95 gm/cm$^3$ to about 1.45 gm/cm$^3$. As discussed, the thermoplastic materials are used for the spline gears 116, 116'. This choice of material provides a contrast to the metallic materials used for the toothed ring gear 102, the flanged hub 130, and the threaded disc 134. Thermoplastics generally have lower densities than metals, contributing to a reduction in the overall weight of the combined material gear 100. Thermoplastics also possess inherent damping characteristics, i.e., they can absorb vibrations and reduce noise during gear operation. Furthermore, thermoplastics can offer self-aligning capabilities due to their lower stiffness compared to metals, which allows the spline gears 116, 116' to accommodate minor misalignments or manufacturing tolerances without generating excessive stresses.

The specified thermoplastic materials, i.e., polyamide resins and polyacetal plastics, are well-known in the art. Polyamide resins, commonly known as nylons, are a family of engineering thermoplastics known for their good strength, toughness, wear resistance, and chemical resistance. Polyacetal plastics, also known as polyoxymethylene (POM), are another family of engineering thermoplastics, and are characterized by their high stiffness, low friction, excellent dimensional stability (resistance to warping or changing shape), and good resistance to chemicals and wear. Polyamides generally offer better toughness and impact resistance, while polyacetals tend to have higher stiffness and better dimensional stability, and thus the choice between them depends on the specific requirements of the application. Further, the specified range for the density for the thermoplastic material is significantly lower than the density of the metallic materials, helping to reduce the overall weight of the combined material gear 100.

In some examples, the thermoplastic material is a polyamide resin having a density in a range of about 0.9 gm/cm$^3$ to about 1.2 gm/cm$^3$, about 0.95 gm/cm$^3$ to about 1.18 gm/cm$^3$, about 1.0 gm/cm$^3$ to about 1.17 gm/cm$^3$, about 1.12 gm/cm$^3$ to about 1.15 gm/cm$^3$, or about 0.95 gm/cm$^3$ to about 1.15 gm/cm$^3$. The polyamide resin may have a density of about 1.12 g/cm$^3$ or about 1.15 gm/cm$^3$. Such specific type of polyamide resin, with the defined density range, is particularly, suitable for gear components. In particular, the given material configuration provides the expected mechanical properties and contribute to accurate weight calculations for the combined material gear 100.

Alternatively, the thermoplastic material is a polyacetal plastic having a density in a range of about 1.2 gm/cm$^3$ to about 1.5 gm/cm$^3$, about 1.3 gm/cm$^3$ to about 1.45 gm/cm$^3$, about 1.35 gm/cm$^3$ to about 1.45 gm/cm$^3$, about 1.4 gm/cm$^3$ to about 1.44 gm/cm$^3$, or about 1.4 gm/cm$^3$ to about 1.43 gm/cm$^3$. The thermoplastic material may be a polyacetal plastic having a density of about 1.4 gm/cm$^3$ or about 1.41 gm/cm$^3$. This specific option for the thermoplastic material with the defined density is typical for many commercially available polyacetal plastics and helps to ensure that the selected material have the expected mechanical properties, such as high stiffness, low friction, and good dimensional stability.

Further, the powder metal material is selected from a group comprising brass, bronze, carbon steel, alloy steel, stainless steel, and cast iron, wherein the powder metal material has a density in a range of about 5 g/cm$^3$ to about 8 gm/cm$^3$, about 5.5 g/cm$^3$ to about 7.5 gm/cm$^3$, about 6 g/cm$^3$ to about 7 gm/cm$^3$, or about 5.8 g/cm$^3$ to about 7.3 gm/cm$^3$. Powder metal materials can provide ultimate tensile strength up to around 900 N/mm$^2$ when pressed and sintered, and up to around 1200 N/mm$^2$ after heat treatment or sinter hardening. Tensile yield stress levels up to around 480 N/mm$^2$ for sintered materials or around 1200 N/mm$^2$ after heat treatment or sinter hardening. Compressive yield stresses are slightly higher at up to around 510 N/mm$^2$ for sintered materials or up to around 1250 N/mm$^2$ after heat treatment. Conversely, powder metal materials low tensile ductility such as around 2% or lower. As discussed, the first and second spline gears 116, 116' can be made of a powder metal material instead of a thermoplastic material. This provides an alternative to the thermoplastic material options, offering a different set of properties. The specified density range is lower than that of solid steel (around 7.85 gm/cm3) due to the inherent porosity of powder metal parts. The porosity can be controlled during the manufacturing process to achieve the desired balance of strength, density, and damping characteristics. The use of powder metal materials for the spline gears provides a compromise between the properties of metallic materials (strength, durability) and the advantages of non-metallic materials (damping, potentially lower weight). The porous structure can contribute to damping and noise reduction.

Figure 7:
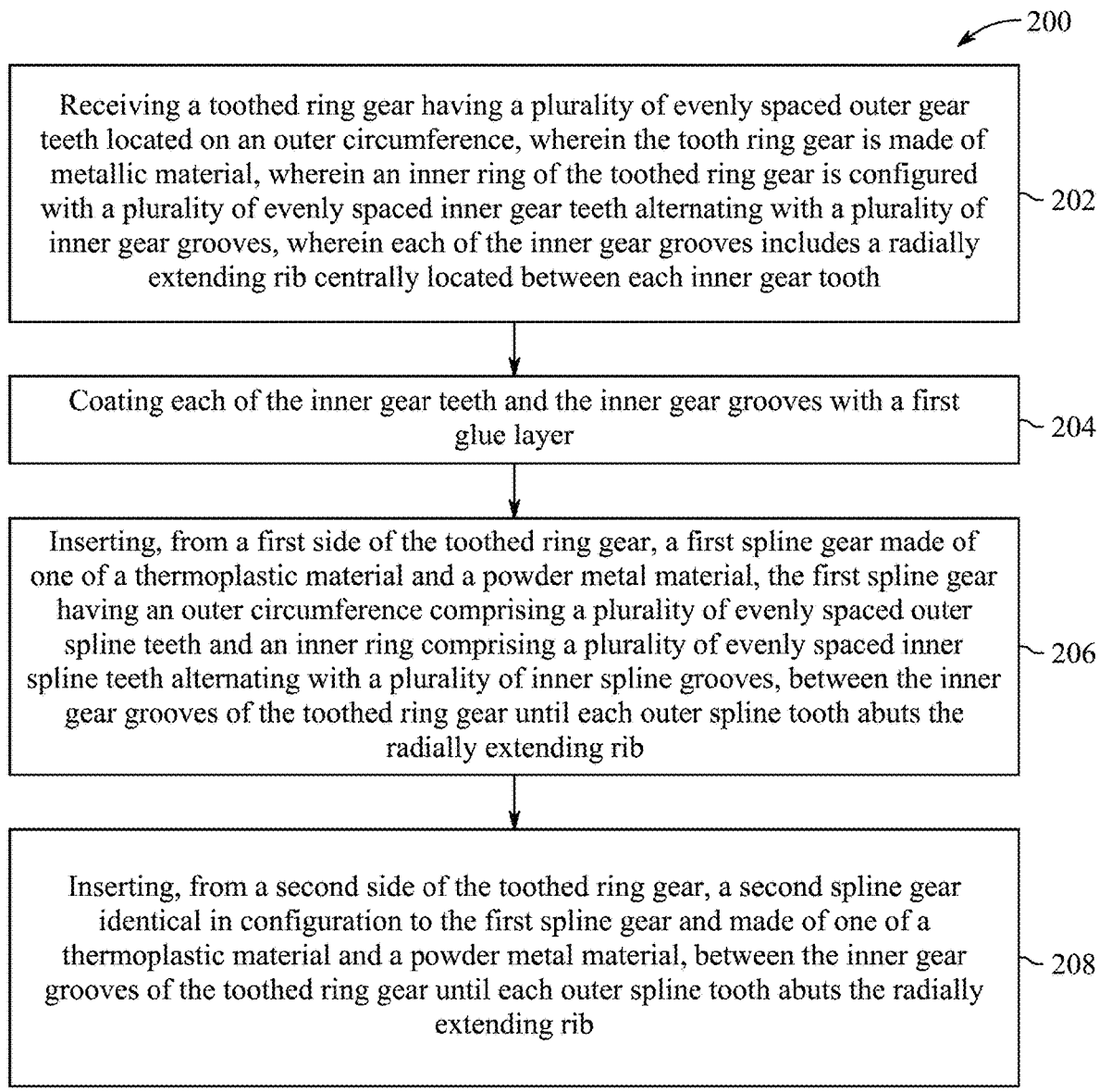
FIG. 7 is an exemplary flowchart listing steps involved in a method of assembling the combined material gear, according to certain embodiments.

Referring now to FIG. 7, illustrated is a flowchart listing steps involved in a method (as represented by reference numeral 200) of assembling a self-aligning combined material gear (i.e., the combined material gear 100). The method 200 includes a series of steps. These steps are only illustrative, and other alternatives may be considered where one or more steps are added, one or more steps are removed, or one or more steps are provided in a different sequence without departing from the scope of the present disclosure. Various variants described above, with respect to the aforementioned combined material gear 100 apply mutatis mutandis to the present method 200.

At step 202, the method 200 includes receiving the toothed ring gear 102 having the plurality of evenly spaced outer gear teeth 104 located on the outer circumference 106, wherein the toothed ring gear 102 is made of metallic material, wherein the inner ring 109 of the toothed ring gear 102 is configured with the plurality of evenly spaced inner gear teeth 110 alternating with the plurality of inner gear grooves 112, wherein each of the inner gear grooves 112 includes the radially extending rib 114 centrally located between each inner gear tooth 110. This initial step of the assembly process involving obtaining the toothed ring gear 102, which has been previously described in detail, provides a foundation of the combined material gear 100, and its features (the outer gear teeth 104, the inner gear teeth 110, the inner gear grooves 112, and the radially extending rib 114), as required for the subsequent assembly steps.

At step 204, the method 200 includes coating each of the inner gear teeth 110 and the inner gear grooves 112 with a first glue layer. This prepares the toothed ring gear 102 for the attachment of the first and second spline gears 116, 116'. The first glue layer, as previously described, is made of a material selected from thermoplastic rubber, thermoplastic olefin, acetal, and polyamide. This glue layer acts as an adhesive to bond the components together, provides damping to reduce noise and vibration, and helps to accommodate minor misalignments. The application of the glue layer to both the inner gear teeth 110 and the inner gear grooves 112 ensures that all contact surfaces between the toothed ring gear 102 and the spline gears 116, 116' are coated.

At step 206, the method 200 includes inserting, from a first side of the toothed ring gear 102, the first spline gear 116 made of one of a thermoplastic material and a powder metal material, the first spline gear 116 having an outer circumference 118 comprising a plurality of evenly spaced outer spline teeth 120 and the inner ring 124 comprising a plurality of evenly spaced inner spline teeth 126 alternating with the plurality of inner spline grooves 128, between the inner gear grooves 112 of the toothed ring gear 102 until each outer spline tooth 120 abuts the radially extending rib 114. This involves the attachment of the first spline gear 116 to the toothed ring gear 102. The first spline gear 116, as previously described, is made of either a thermoplastic material or a powder metal material, and its outer spline teeth 120 are designed to mesh with the inner gear grooves 112 of the toothed ring gear 102. Herein, the first spline gear 116 is inserted from one side of the toothed ring gear 102, and the outer spline teeth 120 are aligned with the inner gear grooves 112. The insertion continues until each outer spline tooth 120 contacts the radially extending rib 114. This abutment against the rib 114 ensures that the first spline gear 116 is properly positioned axially (along the axis of rotation) relative to the toothed ring gear 102. As discussed, the rib 114 acts as a positive stop, preventing further axial movement of the spline gear.

At step 208, the method 200 includes inserting, from a second side of the toothed ring gear 102, the second spline gear 116' identical in configuration to the first spline gear 116 and made of one of a thermoplastic material and a powder metal material, between the inner gear grooves 112 of the toothed ring gear 102 until each outer spline tooth 120 abuts the radially extending rib 114. This step mirrors the previous step, but with the second spline gear 116'. The second spline gear 116', which is identical to the first spline gear 116, is inserted from the opposite side of the toothed ring gear 102. The outer spline teeth 120 of the second spline gear 116' are aligned with the remaining open inner gear grooves 112 of the toothed ring gear 102, and the insertion continues until each outer spline tooth 120 abuts the radially extending rib 114. This ensures that the second spline gear 116' is also properly positioned axially relative to the toothed ring gear 102.

It may be appreciated that with both the spline gears 116, 116' in place, the toothed ring gear 102 is effectively sandwiched therebetween, and the outer spline teeth 120 of the spline gears 116, 116' are engaged with the inner gear grooves 112 and are abutting the radially extending rib 114.

In an aspect of the present disclosure, the method 200 further includes: coating each of the inner spline teeth 126 and the inner spline grooves 128 of the first spline gear 116 with a second glue layer; coating each of the inner spline teeth 126 and the inner spline grooves 128 of the second spline gear 116' with a third glue layer. These steps prepare the inner rings 124 of the first and second spline gears 116, 116' for the attachment of the flanged hub 130. Similar to the first glue layer applied to the toothed ring gear 102, the second and third glue layers serve to enhance the connection between the components, provide damping, and accommodate minor misalignments. The second glue layer is applied to all the inner spline teeth 126 and the inner spline grooves 128 of the first spline gear 116. This ensures that all contact surfaces between the first spline gear 116 and the flanged hub 130 will be coated with the adhesive. The third glue layer is applied in the same manner to the inner spline teeth 126 and the inner spline grooves 128 of the second spline gear 116'. This application of the glue layers maximizes the benefits of adhesion, damping, and self-alignment.

The method 200 further includes inserting the flanged hub 130 of the locking assembly into the inner ring 124 of the first spline gear 116 and into the inner ring 124 of the second spline gear 116', wherein the flanged hub 130 includes the plurality of hub teeth 142 and the plurality of hub grooves 144 configured to mesh with the inner spline teeth 126 and the inner grooves 128 of the first spline gear 116 and the inner spline teeth 126 and the inner grooves 128 of the second spline gear 116' to the toothed ring gear 102, until the flange 131 of the flanged hub 130 abuts a first face of the toothed ring gear 102. The flanged hub 130, as previously described, has the outer circumference 140 with the hub teeth 142 and the hub grooves 144 that are designed to mesh with the inner spline teeth 126 and the inner spline grooves 128 of the spline gears 116, 116'. The flanged hub 130 is inserted into the central openings (inner rings 124) of the first and second spline gears 116, 116', with the hub teeth 142 aligning with the inner spline grooves 128 and the hub grooves 144 aligning with the inner spline teeth 126. The insertion continues until the flange 131 of the flanged hub 130 contacts with the first face of the combined structure of the spline gear 116 and the toothed ring gear 102. In this configuration, the hub portion 132 of the flanged hub 130 extends through the inner rings 124 of both spline gears 116, 116' and the inner ring 109 of the toothed ring gear 102, effectively connecting all three components.

The method 200 further includes screwing the threaded disc 134 onto the set of inner threads 138 of the flanged hub 130 to lock the first spline gear 116 and the second spline gear 116' within the inner ring 109 of the toothed ring gear 102 until the threaded disc 134 is secured against a second face of the toothed ring gear 102. The threaded disc 134, as previously described, has external threads 136 that are designed to mate with the internal threads 138 on the hub portion 132 of the flanged hub 130. The threaded disc 134 is screwed onto the flanged hub 130, and as it is tightened, it advances axially along the hub portion 132. This axial movement draws the threaded disc 134 towards the flange 131 of the flanged hub 130, effectively clamping the first and second spline gears 116, 116' and the toothed ring gear 102 therebetween. The tightening continues until the threaded disc 134 is secured against the second face of the combined structure of the spline gear 116' and the toothed ring gear 102. This creates a strong and rigid connection, preventing any relative axial movement between the components during operation. This step completes the locking assembly, firmly securing all the components of the combined material gear 100.

In some aspects, the method 200 includes rotating the combined material gear 100 assembly by inserting a rotating shaft 108 through an inner hub ring 146 of the flanged hub 130. This represents the operational use of the assembled combined material gear 100. Once the assembly is complete and the locking assembly is secured, the shaft 108 can be inserted through the inner hub ring 146 of the flanged hub 130. The shaft 108 may be connected to a motor or other power source to drive the combined material gear 100 or may be connected to a driven component to receive power from the gear. The inner hub ring 146 may include features such as splines, keyways, or a press-fit configuration to ensure a secure and non-slip connection with the shaft 108.

In present aspects, the method 200 includes selecting the plurality of evenly spaced inner gear teeth 110 of the toothed ring gear 102, the plurality of evenly spaced outer spline teeth 120 of the first spline gear 116, the plurality of evenly spaced outer spline teeth 120 of the second spline gear 116' and the plurality of hub teeth 142 to be spur teeth having straight sides parallel to a face of the toothed ring gear 102. This specifies the selection of spur teeth for all the engaging teeth within the combined material gear 100. As previously discussed, spur teeth have straight sides that are parallel to the face of the toothed ring gear 102 and the axis of rotation. This configuration simplifies the design and manufacturing of the gear system but may result in higher noise and vibration levels compared to helical gears.

Alternatively, the method 200 includes selecting the plurality of evenly spaced inner gear teeth 110 of the toothed ring gear 102, the plurality of evenly spaced outer spline teeth 120 of the first spline gear 116, the plurality of evenly spaced outer spline teeth 120 of the second spline gear 116' and the plurality of hub teeth 142 to be helical teeth set at an angle with respect to a face of the toothed ring gear 102. This specifies the selection of helical teeth for all the engaging teeth within the combined material gear 100. As previously discussed, helical teeth, are angled with respect to the face of the toothed ring gear 102 and the axis of rotation. This configuration provides smoother and quieter operation compared to spur gears but introduces axial forces that may be accommodated by the radially extending rib 114.

The combined material gear 100 and the method 200 of the present disclosure combine different materials, including the metallic material for the toothed ring gear 102, the flanged hub 130, and the threaded disc 134, and either the thermoplastic material or the powder metal material for the first and second spline gears 116, 116'. The use of metallic material provide the necessary strength and durability to withstand the high loads and stresses encountered in gear operation, particularly in the areas of tooth contact and near the hub. Further, the use of either the thermoplastic material or the powder metal material generally offer better damping characteristics (which helps to reduce noise and vibration during gear operation), contribute to self-alignment capabilities due to their lower stiffness (in the case of thermoplastics) or inherent porosity (in the case of powder metals), and lower overall weight for the combined material gear 100. Using this configuration, the combined material gear 100 achieves a superior balance of performance characteristics compared to traditional, single-material gear systems.

The combined material gear 100 can be configured with either spur teeth or helical teeth, depending on the specific application requirements. The design of the combined material gear 100, with its interlocking teeth and grooves, and the locking assembly (including the flanged hub 130 and the threaded disc 134), ensures a secure and precise connection between the components. The radially extending rib 114 on the toothed ring gear 102 provides structural support and axial constraint, particularly important when helical gears are used. The optional glue layer further enhances the connection, providing additional adhesion, damping, and self-alignment capabilities.

A first embodiment describes a combined material gear 100, comprising: a toothed ring gear 102 having a plurality of evenly spaced outer gear teeth 104 located on an outer circumference 106, wherein the toothed ring gear 102 is made of metallic material; an inner ring 109 of the toothed ring gear 102 configured with a plurality of evenly spaced inner gear teeth 110 alternating with a plurality of inner gear grooves 112; a radially extending rib 114 centrally located within the inner ring 109 of the toothed ring gear 102 between each inner gear tooth 110; a first spline gear 116 configured with an outer circumference 118 comprising a plurality of evenly spaced outer spline teeth 120 alternating with a plurality of outer spline grooves 122, wherein the outer spline teeth 120 are configured to fit in the inner gear grooves 112 of the toothed ring gear 102 and abut the radially extending rib 114 when the first spline gear 116 is assembled to a first side of the toothed ring gear 102, wherein the first spline gear 116 is further configured with an inner ring 124 comprising a plurality of evenly spaced inner spline teeth 126 alternating with a plurality of inner spline grooves 128; and a second spline gear 116' identical in configuration to the first spline gear 116, wherein the outer spline teeth 120 of the second spline gear 116' are configured to fit in the inner gear grooves 112 of the toothed ring gear 102 and abut the radially extending rib 114 when the second spline gear 116' is assembled to a second side of the toothed ring gear 102, wherein the first spline gear 116 and the second spline gear 116' are made of one of a thermoplastic material and a powder metal material.

In an aspect, the combined material gear 100, further comprising: a locking assembly configured to lock the first spline gear 116 and the second spline gear 116' to the toothed ring gear 102, wherein the locking assembly includes a flanged hub 130 and a threaded disc 134, wherein each of the flanged hub 130 and the threaded disc 134 are made of metallic material, wherein the flange 131 of the hub 132 is configured to face the first spline gear 116 and the toothed ring gear 102, wherein the hub 132 of the flanged hub 130 is configured to extend through the inner ring 124 of the first spline gear 116, the inner ring 109 of the toothed ring gear 102 and the inner ring 124 of the second spline gear 116', and wherein the threaded disc 134 is configured to engage with a set of inner threads 138 of the flanged hub 130 to lock the first spline gear 116 and the second spline gear 116' within the inner ring 109 of the toothed ring gear 102.

In an aspect, the flanged hub 130 comprises: an outer circumference 140 configured with a plurality of evenly spaced hub teeth 142 alternating with a plurality of hub grooves 144, wherein the plurality of evenly spaced hub teeth 142 and the plurality of hub grooves 144 are configured to mesh with the plurality of evenly spaced inner spline teeth 126 and the plurality of inner spline grooves 128 of the first and second spline gears 116, 116', and an inner hub ring 146 configured to receive a shaft 108.

In an aspect, the inner gear teeth 110, the outer spline teeth 120 of the first spline gear 116 and the second spline gear 116', the inner spline teeth 126 of the first spline gear 116 and the second spline gear 116' and the hub teeth 142 are spur teeth having straight sides parallel to a face of the toothed ring gear 102.

In an aspect, the inner gear teeth 110, the outer spline teeth 120 of the first spline gear 116 and the second spline gear 116', the inner spline teeth 126 of the first spline gear 116 and the second spline gear 116' and the hub teeth 142 are helical teeth set at an angle with respect to a face of the toothed ring gear 102.

In an aspect, the angle is selected from a group comprising about 5 degrees to about 20 degrees.

In an aspect, the combined material gear 100, further comprising: a glue layer between each of the plurality of inner gear teeth 110 and outer spline grooves 122, the inner gear grooves 112 and the outer spline teeth 120, the inner spline teeth 126 and the hub grooves 144, and the inner spline grooves 128 and the hub teeth 142, wherein the glue layer is formed from a glue selected from a group comprising thermoplastic rubber, thermoplastic olefin, acetal and polyamide.

In an aspect, each one of the inner gear teeth 110, the outer spline teeth 120 of the first spline gear 116 and the second spline gear 116' and the hub teeth 142 have a radial length of about 6.23 mm.

In an aspect, the radially extending rib 114 has a radial length of about 4 mm.

In an aspect, the metallic material is selected from a group comprising steel, composite metal, alloy steel, cast iron, copper alloy, carbon steel, tungsten, tungsten carbide and bronze, wherein the metallic material has a density of about 7.85 gm/cm$^3$ to about 15.63 gm/cm$^3$.

In an aspect, the metallic material is steel and has a density of about 7.85 gm/cm$^3$.

In an aspect, the thermoplastic material is selected from a group comprising a polyamide resin and a polyacetal plastic, wherein the thermoplastic material has a density of about 0.95 gm/cm$^3$ to about 1.45 gm/cm$^3$.

In an aspect, the thermoplastic material is a polyamide resin having a density in a range of about 1.12 g/cm$^3$ to about 1.15 gm/cm$^3$.

In an aspect, the thermoplastic material is a polyacetal plastic having a density of about 1.41 gm/cm$^3$.

In an aspect, the powder metal material is selected from a group comprising brass, bronze, carbon steel, alloy steel, stainless steel, and cast iron, wherein the powder metal material has a density in a range of about 5.8 g/cm$^3$ to about 7.3 gm/cm$^3$.

A second embodiment describes a method 200 of assembling a self-aligning combined material gear 100, comprising: receiving 202 a toothed ring gear 102 having a plurality of evenly spaced outer gear teeth 104 located on an outer circumference 106, wherein the toothed ring gear 102 is made of metallic material, wherein an inner ring 109 of the toothed ring gear 102 is configured with a plurality of evenly spaced inner gear teeth 110 alternating with a plurality of inner gear grooves 112, wherein each of the inner gear grooves 112 includes a radially extending rib 114 centrally located between each inner gear tooth 110; coating 204 each of the inner gear teeth 110 and the inner gear grooves 112 with a first glue layer; inserting 206, from a first side of the toothed ring gear 102, a first spline gear 116 made of one of a thermoplastic material and a powder metal material, the first spline gear 116 having an outer circumference 118 comprising a plurality of evenly spaced outer spline teeth 120 and an inner ring 124 comprising a plurality of evenly spaced inner spline teeth 126 alternating with a plurality of inner spline grooves 128, between the inner gear grooves 112 of the toothed ring gear 102 until each outer spline tooth 120 abuts the radially extending rib 114; and inserting 208, from a second side of the toothed ring gear 102, a second spline gear 116' identical in configuration to the first spline gear 116 and made of one of a thermoplastic material and a powder metal material, between the inner gear grooves 112 of the toothed ring gear 102 until each outer spline tooth 120 abuts the radially extending rib 114.

In an aspect, the method 200 further comprises: coating each of the inner spline teeth 126 and the inner spline grooves 128 of the first spline gear 116 with a second glue layer; coating each of the inner spline teeth 126 and the inner spline grooves 128 of the second spline gear 116' with a third glue layer; and inserting a flanged hub 130 of a locking assembly into the inner ring 124 of the first spline gear 116 and into the inner ring 124 of the second spline gear 116', wherein the flanged hub 130 includes a plurality of hub teeth 142 and a plurality of hub grooves 144 configured to mesh with the inner spline teeth 126 and the inner grooves 128 of the first spline gear 116 and the inner spline teeth 126 and the inner grooves 128 of the second spline gear 116' to the toothed ring gear 102, until the flange 131 of the flanged hub 130 abuts a first face of the toothed ring gear 102, and screwing the threaded disc 134 onto a set of inner threads 138 of the flanged hub 130 to lock the first spline gear 116 and the second spline gear 116' within the inner ring 109 of the toothed ring gear 102 until the threaded disc 134 is secured against a second face of the toothed ring gear 102.

In an aspect, the method 200 further comprises: rotating the combined material gear 100 assembly by inserting a rotating shaft 108 through an inner hub ring 146 of the flanged hub 130.

In an aspect, the method 200 further comprises: selecting the plurality of evenly spaced inner gear teeth 110 of the toothed ring gear 102, the plurality of evenly spaced outer spline teeth 120 of the first spline gear 116, the plurality of evenly spaced outer spline teeth 120 of the second spline gear 116' and the plurality of hub teeth 142 to be spur teeth having straight sides parallel to a face of the toothed ring gear 102.

In an aspect, the method 200 further comprises: selecting the plurality of evenly spaced inner gear teeth 110 of the toothed ring gear 102, the plurality of evenly spaced outer spline teeth 120 of the first spline gear 116, the plurality of evenly spaced outer spline teeth 120 of the second spline gear 116' and the plurality of hub teeth 142 to be helical teeth set at an angle with respect to a face of the toothed ring gear 102.

Numerous modifications and variations of the present disclosure are possible in light of the above teachings. It is therefore to be understood that within the scope of the appended claims, the invention may be practiced otherwise than as specifically described herein.

The invention claimed is:

1. A combined material gear, comprising:
a toothed ring gear having a plurality of evenly spaced outer gear teeth located on an outer circumference, wherein the tooth ring gear is made of a metallic material;
an inner ring of the toothed ring gear configured with a plurality of evenly spaced inner gear teeth alternating with a plurality of inner gear grooves;
a radially extending rib centrally located within the inner ring of the toothed ring gear between each inner gear tooth;
a first spline gear configured with an outer circumference comprising a plurality of evenly spaced outer spline teeth alternating with a plurality of outer spline grooves, wherein the outer spline teeth are configured to fit in the inner gear grooves of the toothed ring gear and abut the radially extending rib when the first spline gear is assembled to a first side of the toothed ring gear, wherein the first spline gear is further configured with an inner ring comprising a plurality of evenly spaced inner spline teeth alternating with a plurality of inner spline grooves; and
a second spline gear identical in configuration to the first spline gear, wherein the outer spline teeth of the second spline gear are configured to fit in the inner gear grooves of the toothed ring gear and abut the radially extending rib when the second spline gear is assembled to a second side of the toothed ring gear, wherein the first spline gear and the second spline gear are made of one of a thermoplastic material and a powder metal material.

2. The combined material gear of claim 1, further comprising:
a locking assembly configured to lock the first spline gear and the second spline gear to the toothed ring gear,
wherein the locking assembly includes a flanged hub and a threaded disc, wherein each of the flanged hub and the threaded disc are made of metallic material,
wherein the flange of the hub is configured to face the first spline gear and the toothed ring gear,
wherein the hub of the flanged hub is configured to extend through the inner ring of the first spline gear, the inner ring of the toothed ring gear and the inner ring of the second spline gear, and
wherein the threaded disc is configured to engage with a set of inner threads of the flanged hub to lock the first spline gear and the second spline gear within the inner ring of the toothed ring gear.

3. The combined material gear of claim 2, wherein the flanged hub comprises:
an outer circumference configured with a plurality of evenly spaced hub teeth alternating with a plurality of hub grooves, wherein the plurality of evenly spaced hub teeth and the plurality of hub grooves are configured to mesh with the plurality of evenly spaced inner spline teeth and the plurality of inner spline grooves; and
an inner hub ring configured to receive a shaft.

4. The combined material gear of claim 3, wherein the inner gear teeth, the outer spline teeth of the first spline gear and the second spline gear, the inner spline teeth of the first spline gear and the second spline gear and the hub teeth are spur teeth having straight sides parallel to a face of the toothed ring gear.

5. The combined material gear of claim 3, wherein the inner gear teeth, the outer spline teeth of the first spline gear and the second spline gear, the inner spline teeth of the first spline gear and the second spline gear and the hub teeth are helical teeth set at an angle with respect to a face of the toothed ring gear.

6. The combined material gear of claim 5, wherein the angle is selected from a group comprising about 5 degrees to about 20 degrees.

7. The combined material gear of claim 3, further comprising:
a glue layer between each of the plurality of inner gear teeth and outer spline grooves, the inner gear grooves and the outer spline teeth, the inner spline teeth and the hub grooves, and the inner spline grooves and the hub teeth,
wherein the glue layer is formed from a glue selected from a group comprising thermoplastic rubber, thermoplastic olefin, acetal and polyamide.

8. The combined material gear of claim 3, wherein each one of the inner gear teeth, the outer spline teeth of the first spline gear and the second spline gear and the hub teeth have a radial length of about 6.25 mm.

9. The combined material gear of claim 3, wherein the radially extending rib has a radial length of about 4 mm.

10. The combined material gear of claim 3, wherein the metallic material is selected from a group comprising steel, composite metal, alloy steel, cast iron, copper alloy, carbon steel, tungsten carbide and bronze, wherein the metallic material has a density in a range of about 7.85 gm/cm$^3$ to about 15.63 gm/cm$^3$.

11. The combined material gear of claim 10, wherein the metallic material is steel and has a density of about 7.85 gm/cm$^3$.

12. The combined material gear of claim 1, wherein the thermoplastic material is selected from a group comprising a polyamide resin and a polyacetal plastic, wherein the thermoplastic material has a density of about 0.95 gm/cm$^3$ to about 1.45 gm/cm$^3$.

13. The combined material gear of claim 12, wherein the thermoplastic material is a polyamide resin having a density in a range of about 1.12 g/cm$^3$ to about 1.15 gm/cm$^3$.

14. The combined material gear of claim 12, wherein the thermoplastic material is a polyacetal plastic having a density of about 1.41 gm/cm$^3$.

15. The combined material gear of claim 1, wherein the powder metal material is selected from a group comprising brass, bronze, carbon steel, alloy steel, stainless steel, and cast iron, wherein the powder metal material has a density in a range of about 5.8 g/cm$^3$ to about 7.3 gm/cm$^3$.

16. A method of assembling a self-aligning combined material gear, comprising:
receiving a toothed ring gear having a plurality of evenly spaced outer gear teeth located on an outer circumference, wherein the tooth ring gear is made of metallic material, wherein an inner ring of the toothed ring gear is configured with a plurality of evenly spaced inner gear teeth alternating with a plurality of inner gear grooves, wherein each of the inner gear grooves includes a radially extending rib centrally located between each inner gear tooth;
coating each of the inner gear teeth and the inner gear grooves with a first glue layer;
inserting, from a first side of the toothed ring gear, a first spline gear made of one of a thermoplastic material and a powder metal material, the first spline gear having an outer circumference comprising a plurality of evenly spaced outer spline teeth and an inner ring comprising a plurality of evenly spaced inner spline teeth alternating with a plurality of inner spline grooves, between the inner gear grooves of the toothed ring gear until each outer spline tooth abuts the radially extending rib; and
inserting, from a second side of the toothed ring gear, a second spline gear identical in configuration to the first spline gear and made of one of a thermoplastic material and a powder metal material, between the inner gear grooves of the toothed ring gear until each outer spline tooth abuts the radially extending rib.

17. The method of claim 16, further comprising:
coating each of the inner spline teeth and the inner spline grooves of the first spline gear with a second glue layer;
coating each of the inner spline teeth and the inner spline grooves of the second spline gear with a third glue layer;
inserting a flanged hub of a locking assembly into the inner ring of the first spline gear and into the inner ring of the second spline gear, wherein the flanged hub includes a plurality of hub teeth and a plurality of hub grooves configured to mesh with the inner spline teeth and the inner grooves of the first spline gear and the inner spline teeth and the inner grooves of the second spline gear to the toothed ring gear, until the flange of the flanged hub abuts a first face of the toothed ring gear; and
screwing the threaded disc onto a set of inner threads of the flanged hub to lock the first spline gear and the second spline gear within the inner ring of the toothed ring gear until the threaded disc is secured against a second face of the toothed ring gear.

18. The method of claim 17, further comprising:
rotating the combined material gear assembly by inserting a rotating shaft through an inner hub ring of the flanged hub.

19. The method of claim 17, further comprising:
selecting the plurality of evenly spaced inner gear teeth of the toothed ring gear, the plurality of evenly spaced outer spline teeth of the first spline gear, the plurality of evenly spaced outer spline teeth of the second spline gear and the plurality of hub teeth to be spur teeth having straight sides parallel to a face of the toothed ring gear.

20. The method of claim 17, further comprising:
selecting the plurality of evenly spaced inner gear teeth of the toothed ring gear, the plurality of evenly spaced outer spline teeth of the first spline gear, the plurality of evenly spaced outer spline teeth of the second spline gear and the plurality of hub teeth to be helical teeth set at an angle with respect to a face of the toothed ring gear.

* * * * *